United States Patent
Osborn et al.

(10) Patent No.: US 11,610,280 B2
(45) Date of Patent: *Mar. 21, 2023

(54) STEGANOGRAPHIC IMAGE ENCODING OF BIOMETRIC TEMPLATE INFORMATION ON A CARD

(71) Applicant: Capital One Services, LLC, McLean, VA (US)

(72) Inventors: Kevin Osborn, Newton, MA (US); Srinivasa Chigurupati, Long Grove, IL (US); Jeffrey Rule, Chevy Chase, MD (US)

(73) Assignee: Capital One Services, LLC, McLean, VA (US)

( * ) Notice: Subject to any disclaimer, the term of this patent is extended or adjusted under 35 U.S.C. 154(b) by 37 days.

This patent is subject to a terminal disclaimer.

(21) Appl. No.: 17/462,092

(22) Filed: Aug. 31, 2021

(65) Prior Publication Data

US 2021/0390652 A1    Dec. 16, 2021

Related U.S. Application Data

(63) Continuation of application No. 16/842,335, filed on Apr. 7, 2020, now Pat. No. 11,138,304, which is a continuation of application No. 16/726,565, filed on Dec. 24, 2019, now Pat. No. 10,664,941.

(51) Int. Cl.
*G06F 21/00* (2013.01)
*G06T 1/00* (2006.01)
*G06Q 20/34* (2012.01)
*G06Q 20/40* (2012.01)
*G06F 21/32* (2013.01)

(52) U.S. Cl.
CPC .............. *G06T 1/005* (2013.01); *G06F 21/32* (2013.01); *G06Q 20/352* (2013.01); *G06Q 20/405* (2013.01); *G06Q 20/40145* (2013.01)

(58) Field of Classification Search
None
See application file for complete search history.

(56) References Cited

U.S. PATENT DOCUMENTS

2006/0157559 A1* 7/2006 Levy ................ G06Q 20/40145
                                                                                   235/380
2013/0303085 A1* 11/2013 Boucher ............. H04W 12/069
                                                                                    455/41.1

* cited by examiner

*Primary Examiner* — Andrew J Steinle
(74) *Attorney, Agent, or Firm* — KDB Firm PLLC

(57) ABSTRACT

Various embodiments are generally directed to utilizing a steganographically encoded image with an offline and/or online verification or authentication protocol. A method for using the steganographic image can include: receiving or utilizing a steganographic image associated with a user at a third-party device, the steganographically encoded image including an identification of a user steganographically encoded with a fingerprint template of the user, and authenticating the user using the steganographically encoded image.

20 Claims, 10 Drawing Sheets

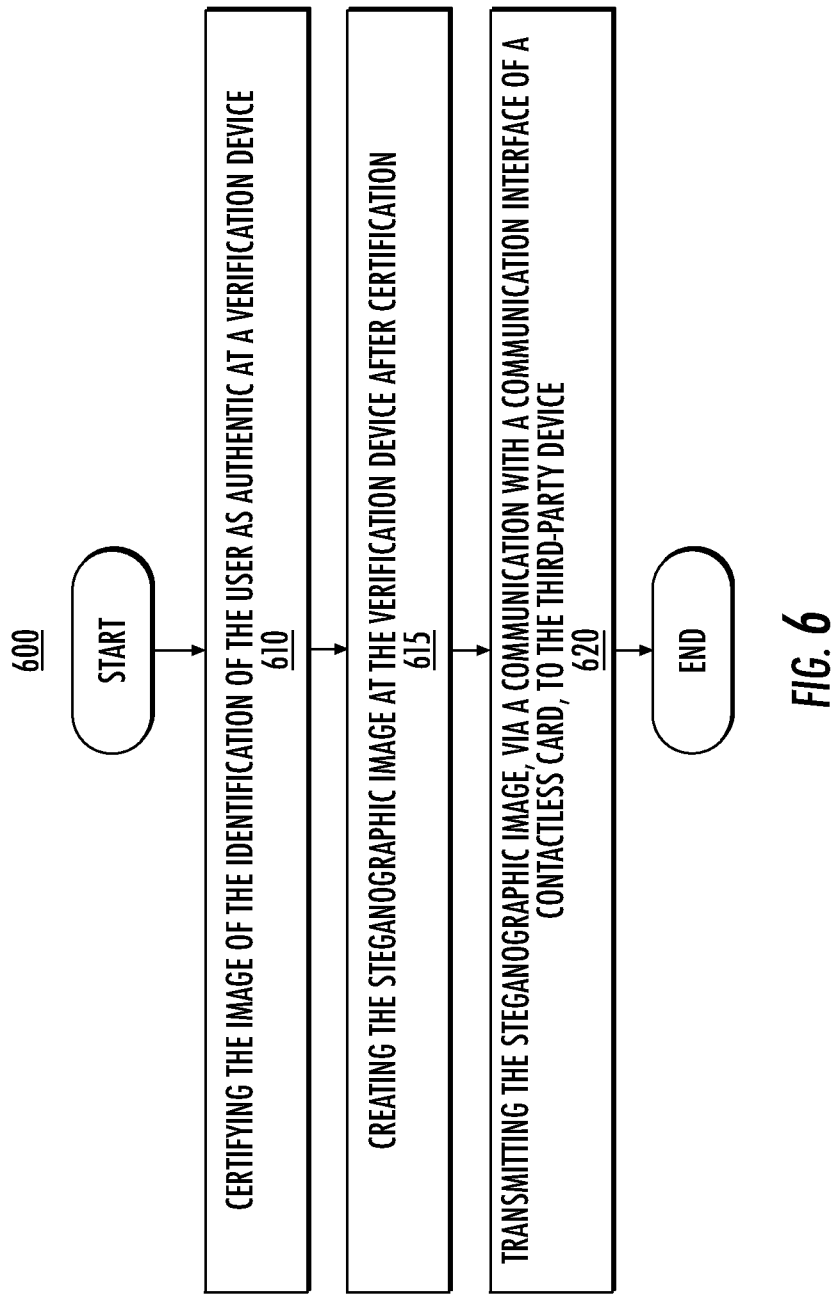

STEGANOGRAPHIC IMAGE ENCODING OF BIOMETRIC TEMPLATE INFORMATION ON A CARD

RELATED APPLICATIONS

This application is a continuation of U.S. patent application Ser. No. 16/842,335, filed Apr. 7, 2020, which is a continuation of U.S. patent application Ser. No. 16/726,565 (now U.S. Pat. No. 10,664,941), filed Dec. 24, 2019. The contents of the aforementioned applications are incorporated herein by reference in their entirety.

STATEMENT OF INCORPORATION BY REFERENCE

The present application is related to application Ser. No. 16/135,954 entitled "Systems and Methods For Providing Card Interactions" filed on Sep. 19, 2018, the entirety of which is incorporated herein by reference.

TECHNICAL FIELD

Embodiments herein generally relate to computing platforms, and more specifically, utilizing a steganographically encoded image to authenticate a user.

BACKGROUND

Activating many cards, and more specifically financial cards (e.g., credit cards), involve the time-consuming process of cardholders calling a telephone number or visiting a website and entering or otherwise providing card information. Further, while the growing use of chip-based financial cards provides more secure features over the previous technology (e.g., magnetic strip cards) for in-person purchases, account access still typically relies on log-in credentials (e.g., username and password) to confirm a cardholder's identity and/or otherwise complete a transaction. However, if the log-in credentials are compromised, another person could have access to the user's account.

Accordingly, there is a need to improve authentication mechanisms for account access and the competition of transactions, including payment transactions.

SUMMARY

Embodiments disclosed herein provide systems, methods, articles of manufacture, and computer-readable media for utilizing a steganographically encoded image to verify a user and/or complete a transaction, including but not limited to a payment transaction. According to one or more examples, an online or offline protocol is used to verify and/or authenticate a user in order to initiate an exchange of information that utilizes the steganographic image for authentication.

According to one example, a computer implemented method utilizing application executing on a computer system may initiate a transaction to verify an identity of a user and/or authorizing a transaction using a steganographically encoded image. In various embodiments, the application may be launched by tapping the contactless card on a user device, e.g. a mobile device. The method can include: communicating, by an application executing on a processor circuit associated with a computer device of the user and using near field communication (NFC), with the contactless card, the contactless card having a radio frequency identification (RFID) chip, and the contactless card being within an NFC range of the digital reader associated with the third-party device, performing at least one verification operation by the application and in communication with the contactless card, responsive to performing the at least one verification operation and in communication with the contactless card, receiving a steganographic image to authenticate a user associated with the computer device, wherein the steganographic image includes a government issued identification of a user steganographically encoded with a fingerprint template of the user, wherein the steganographic image is created by: certifying the image of the identification of the user as authentic at a verification device, and creating the steganographic image at the verification device after certification.

According to another example, a system employing online and/or offline authentication and the steganographically encoded image to authenticate and/or verify a user and/or authorize a transaction. The system can include: a processor circuit, and a memory storing instructions which when executed by the processor circuit, cause the processor circuit to: receive, by an application executing on a processor circuit associated with a computer device and from a user, a first application user credential associated with a user profile, compare, for a first match and by the processor associated with the application, the first application user credential with a stored second application user credential, the stored second application user credential being associated with a user identity, and responsive to finding the first match, authenticate an identity of a user by initiating a communication with a communication interface of a contactless card, the communication including performing i) at least one of a) a host-less verification operation and b) an issuer based verification operation and ii) an exchange of information that includes an image of a government identification of the user, the image including a steganographically encoding of a fingerprint template associated with the user.

According to yet another example, a contactless card with a communication interface for communicating with a computing device, and a processing circuitry for storing information is provided, where the information includes an identification image of a user, where the identification image is steganographically encoded with a fingerprint template associated with the user.

BRIEF DESCRIPTION OF THE DRAWINGS

FIG. 6 illustrates an embodiment of a second logic flow.

DETAILED DESCRIPTION

Aspects of the present disclosure include systems, methods, and/or techniques for providing authenticated cardholder access. Generally, various embodiments relate to creating a steganographically encoded image and utilizing the steganographically encoded image to verify a user and/or authorize a transaction, such as a payment transaction. In various embodiments, the steganographically encoded image is used in conjunction with one or both of an offline and online authentication protocol, e.g. a user may be authenticated by an offline and/or online in order to receive or otherwise utilize the steganographic image. In various embodiments, the steganographically encoded image is a fingerprint template encoded on an identification, such as a government identification, where the government identification can be certified as an authentic utilizing one or more confirmation techniques can be certified as authentic prior or after steganographically encoding the finger print template on an image of the government identification and/or on a medium reflecting the image on the government identification. Consistent with the disclosed embodiments, the systems and methods may utilize one or more computing devices, processors, web servers, account servers, and/or contactless devices (e.g., radio frequency identification (RFID) cards).

Various embodiments of the present disclosure provide one or more benefits in terms of verifying a user and completing a transaction, such as a payment transaction. In various embodiments, utilizing a steganographically encoded image offers benefits in and of itself by having at least one feature associated with identifying the user, e.g. a finger print template, encoded on an image or medium in a manner that is secure and concealed, prohibiting the image from being compromised or misused, as a steganographic image is not readily discernible either by the naked eye or traditional scanning techniques. These benefits can be enhanced in the verification context, where in various embodiments, the medium or image that contains the steganographic image is a certified identification of the user, as this can provide an initial method of verifying and/or identifying the user, prior to scanning the image decrypt and obtain the fingerprint template, where the fingerprint template can be compared to a scan of a user's fingerprint as an additional security measure. Furthermore, these benefits can be further enhanced with an additional layer of security that includes utilizing the steganographic image only after an offline and/or online authentication protocol takes place, which grants access to the steganographically encoded image. Accordingly, the various embodiments can significantly improve the security associated with verifying a user and/or authenticating a transaction initiated by the user.

Figure 1:
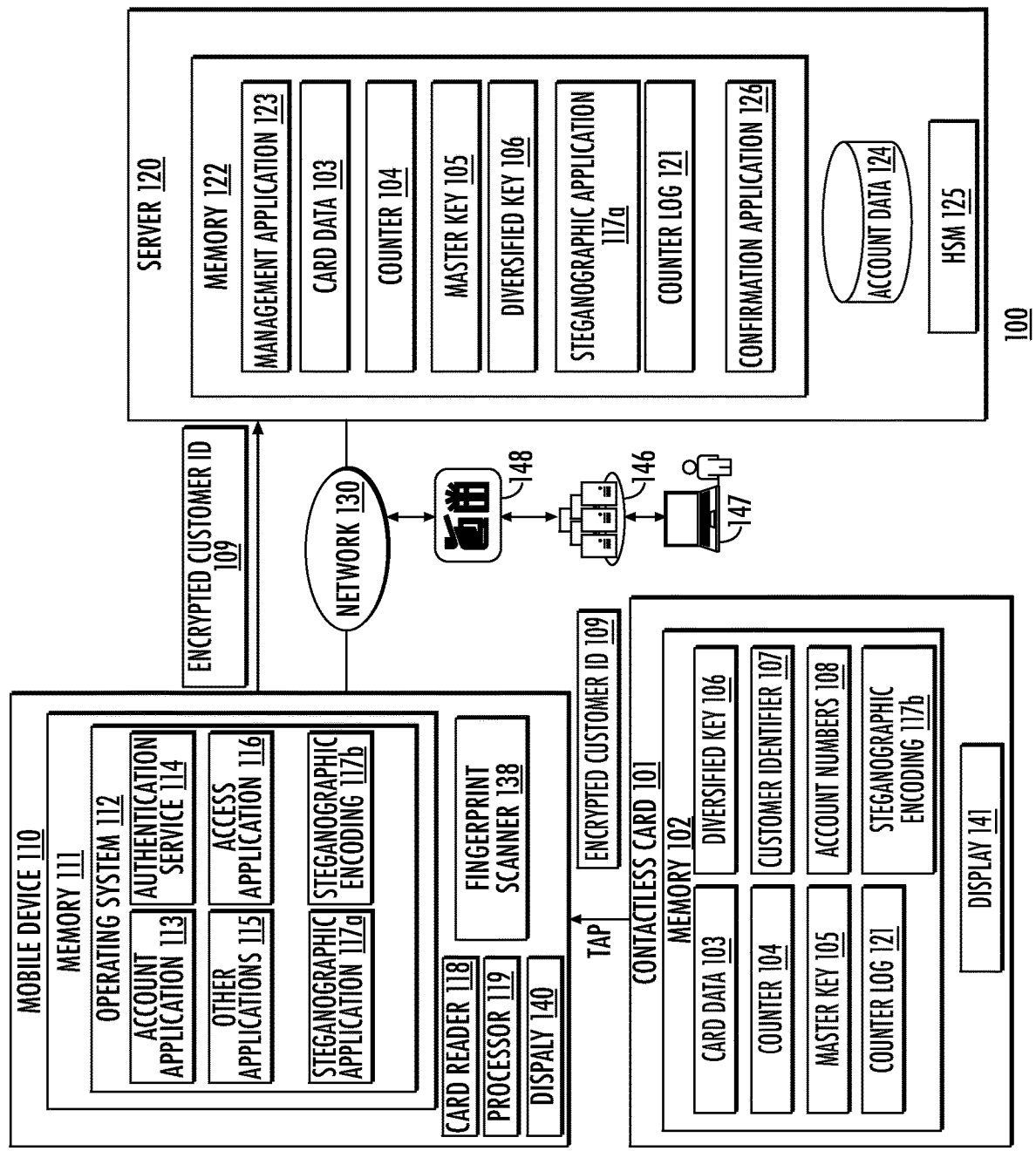
FIG. 1 illustrates an embodiments of a system for verifying or authenticating a user according to a payment protocol.

FIG. 1 depicts a schematic of an exemplary system 100, consistent with disclosed embodiments. As shown, the system 100 includes one or more contactless cards 101, one or more mobile devices 110, and a server 120. The contactless cards 101 are representative of any type of payment card, such as a credit card, debit card, ATM card, gift card, and the like. In various embodiments, the contactless card 101 or card 101 is a virtual payment card. The contactless cards 101 may comprise one or more chips (not depicted), such as a radio frequency identification (RFID) chip, configured to communicate with the mobile devices 110 via NFC, the EMV standard, or other short-range protocols in wireless communication. Although NFC is used as an example communications protocol, the disclosure is equally applicable to other types of wireless communications, such as other suitable communication protocols pursuant to the EMV standard, Bluetooth, and/or Wi-Fi. The mobile devices 110 are representative of any type of network-enabled computing devices, such as smartphones, tablet computers, wearable devices, laptops, portable gaming devices, and the like. The server 120 is representative of any type of computing device, such as a server, workstation, computer cluster, cloud computing platform, virtualized computing system, and the like.

As shown, a memory 102 of the contactless card includes card data 103, a counter 104, a master key 105, a diversified key 106, a unique customer identifier 107, and a data store of account numbers 108. The card data 103 generally includes account-related information, such as information used to process a payment using the contactless card 101. For example, the card data 103 may comprise an account number, an expiration date, a billing address, and a card verification value (CVV). The account number may be any type of account number, such as a primary account number (PAN), a virtual account number, and/or a token generated based on the PAN. Other types of account numbers are contemplated, and the use of the account number or other types of card data 103 should not be considered limiting of the disclosure. The card data 103 may further include names, billing address, shipping address, and other account-related information. The account numbers 108 store one-time-use virtual account numbers with associated expiration dates and CVV values. For example, the account numbers 108 may include thousands single-use virtual account numbers, expiration dates, and CVV values.

As shown, a memory 111 of the mobile device 110 includes an instance of an operating system (OS) 112 and a processor 119 may execute one or more operations associated with the applications of the operating system (OS) 112 and/or perform any other suitable operation associated with processor activity, including comparison operations and executing instructions associated with memory 111. Example operating systems 112 include the Android® OS, iOS®, Linux®, and Windows® operating systems. As shown, the OS 112 includes one or more applications, including an account application 113, an authentication or verification application or service 114 (hereinafter referred to as "authentication application" for convenience), one or more other applications 115, and/or one or more access applications 116. The account application 113 allows users to perform various account-related operations, such as viewing account balances, purchasing items, and processing payments. Initially, a user may authenticate using authentication credentials to access the account application 113. For example, the authentication credentials may include a username and password, biometric credentials, and the like.

The authentication application 114 is generally configured to determine when a user requires authentication for a transaction, service, or accessibility request, including for completing a payment associated with an application. For example, the authentication application 114 may determine that a user requires access to a particular application and/or to complete a transaction or payment associated therewith, such as access application 116. Access application 116 may be or may include an application configured to grant access to one or more features of a particular service associated with a user account, such as a transportation service (e.g. public transit), bank account, health insurance account, a financial account or financial application that contains account balances, brokerage information, or any other suitable financial data, a service application (retail services, delivery services, entertainment services, gaming services, etc.), and any other suitable application that may require user authentication. In various embodiments, the access application 116 may be associated with a payment feature, e.g. a credit or bank account for making or receiving payment, and/or the authentication transaction may still implicate a non-payment feature for authentication or verification, e.g. credit or debit card activation. In various embodiments, access application 116 is a retail or goods/services provision application, and one or more features associated with access application 116 involves completing a payment in association with goods or services offered in relation to access application 116, where, as discussed below, the transaction or payment in association therewith can be completed by utilizing a steganographically encoded image, where, in various embodiments, the steganographically encoded image can be utilized pursuant to an online and/or offline authorization protocol. In various embodiments, the authentication application 114 may facilitate the authentication protocol utilizing a separate API interface and call for access to access applications 116. The authentication application 114 may be configured to verify a user by utilizing any suitable protocol, including one or more of any verification process utilizing cryptographic techniques, an EMV standard or authentication protocol compliant with an EMV standard. In various embodiments, the authentication application 114 is configured to synchronize a counter 104 associated with a contactless card 101 and a server 120 associated with an issuer that can communicate with the contactless card 101 and the mobile device when an authentication of a user takes place.

In various embodiments, the authentication application 114 may coordinate with the server 120 and/or the contactless card 101 to log an authorization for a non-payment transaction in relation to a counter 104. The log may be a counter log 121 located in a memory 122 of the server 120 or a memory 102 of the contactless card 101. The log may keep a separate transaction tally of transactions that are payment transactions and non-payment transactions, irrespective of the total tally of the counter 104, and the server 120 or the contactless card 101. The server 120 and/or the authentication application 114 communicating with the contactless card may utilize the information contained therein for an anti-fraud measure. For example, the authentication application 114 and/or the server 120 may decline a payment transaction if a threshold number of non-payment transactions is too small (or too large) in between the non-payment transactions and the payment transaction or vice versa. In various embodiments, the counter log 121 containing distinguishing information, e.g. counts, between non-payment and payment transactions may be used for any other suitable purposes during an online or offline verification protocol.

In various embodiments, the authentication application 114 is associated with the account application 113. For example, the authentication application 114 may be installed on the mobile device 110 with the account application 113, and the user is prompted to enable the authentication application 114 subsequent to the installation. More generally, each time the account application 113 is opened, the account application 113 may determine whether the authentication application 114 is enabled as the default authentication application for the OS 112. If the authentication application 114 is not enabled as the default authentication application, the account application 113 may prompt the user to enable the authentication application 114 as the default authentication application for the OS 112 and/or to enable one or more functionalities of the authentication application 114. Once enabled as the default authentication application for the OS 112, the authentication application 114 may programmatically identify when authorization applications require authentication and may utilize a payment protocol to enable the verification, even if a payment is not associated with the verification or authorization. In various embodiments, in order to initiate an authentication or verification protocol (e.g. at least one operation associated with an online or offline verification technique or protocol), the authentication application 114 may prompt the user to tap a contactless card 101 to the mobile device 110 to initiate the authentication application 114 or one or more operations associated therewith, including accessing or utilizing a steganographically encoded image 117b stored in the contactless card 101 and/or the mobile device 110.

The system 100 can include the steganographic application 117a stored in the memory 111 of the mobile 110 and/or the memory 122 of the server 120. In various embodiments, the steganographic application 117a can perform one or more steganographic operations, including noise-based processes, chaffing and winnowing, embedding and encryption techniques, mimicking and/or any other suitable steganographic encoding technique or techniques can be used to encode an image or template on another image and/or medium reflecting the other image. For example, the encoding application 117a can encode a fingerprint template of a user on an identification of a user, such as a government identification of a user, onto an image of the government identification of the user and/or a medium, e.g. plastic frame, reflecting the image of the government identification, e.g. a driver's license, of the user. The steganographically encoded image, e.g. fingerprint template, will not be visible to the naked eye and/or a scanning device that cannot decrypt the identification image in a matching fashion to the technique used to steganographically encode the fingerprint template onto the image (or medium) of the identification. It is noted that in various embodiments a fingerprint template is not an actual fingerprint image, but a data set containing fingerprint features, where the fingerprint template may be compared to an actual fingerprint by configuring a scanning device to scan a user's finger for a fingerprint, and recreate the fingerprint template from the fingerprint scan, and compare the extracted fingerprint template to the previously obtained fingerprint template (e.g. stored in memory of the mobile device 110, the server 120, or any suitable device) for a match. The steganographically encoded image can be stored in the memory 111 of mobile device 110, the memory 122 of the server 120, and/or the memory 102 of the contactless card 101.

In various embodiments, the mobile device 110 can include a fingerprint scanner 138. The fingerprint scanner 138 can be configured to scan a user's finger for a fingerprint and create a fingerprint template from the scanned fingerprint template. The fingerprint scanner 138 can further be configured to have a suitable steganographic decoding application or technique to decode a steganographically encoded image 117b, e.g. a government issued identification of the user with fingerprint template steganographically encoded thereon. The fingerprint scanner 138 as shown is part of the mobile device 110, but scanners independent of the mobile device may be used to scan the finger of the user, and the steganographic encoded image 117b can be compared to a fingerprint derived from the scan, where the scan may be local in instances where the image 117b is directly scanned from either the mobile device 110 and/or the contactless card 101. If a match occurs, the scanner 138 can communicate the positive result to authentication application 114, which in turn can grant access to one or more features of access application 116, including completing a transaction associated therewith (e.g. a payment transaction).

In various other embodiments, the image 117b can be transmitted from the server 120 for a comparison to be performed and/or, in various embodiments, the finger print scan may be transmitted to the sever from the mobile device, and the server can have suitable application, e.g. management application 123, that derives a template from the fingerprint scan and compares it to the stored version of the steganographically encoded image 117b. The management application 123 can then communicate to a suitable component of the mobile device 110, e.g. authentication application 114, that the match is positive, which in turn can grant access to one or more features of access application 116, including completing a transaction associated therewith (e.g. a payment transaction).

In various embodiments, a user may certify his or her identification, e.g. a government issued identification such as a driver's license, at a facility 146 associated with an issuer of card services, including a service associated with contactless card 101. At the facility 146, a representative 147 can verify the authenticity of the identification by performing any suitable verification of the government identification, e.g. electronically scanning it and comparing it to public records, and performing a computer transaction that utilizes a server verification at a server associated with the issuer, e.g. server 120, where the server is notified that the user is associated with a verified government identification, without storing the government identification at the server 120 (e.g. for privacy concerns). The account data 124 of the server 120 can be updated to indicate that a verified government identification associated with the user exists. At the facility 146, the representative can utilize any suitable scanner and steganographic application, including but not limited to fingerprint scanner 138 and steganographic application 117a on mobile device 110, to obtain an image of the government identification, scan a fingerprint of the user, derive a fingerprint template form the scanned fingerprint, and steganographically encode the fingerprint template on an image of the government identification. The government image with the steganographic encoding, e.g. image 117b, can be stored locally on either the contactless card 101 and/or the mobile device 110, with the server 120 being notified that the procedure has taken place in account data 124. In various embodiments, this can protect the user's privacy without compromising security as the stored government image with the steganographic encoding of the fingerprint template, e.g. collectively image 117b, can be used to verify the user locally. For example, if the user seeks to execute a transaction associated with access application 116 at a location 148 (e.g. retail shop) with a computer system affiliated with the issuer associated with server 120, a representative at the location 148 may compare a physical copy of the user's government identification to the stored electronic version (at the mobile device 110 and/or contactless card 110) for access to a first-level of information. Since the identification has been officially verified, the local copy of the government identification can be compared to the physical copy of the user identification with a certain level of certainty that the government identification is authentic. The first-level of information can be account balances, loyalty point balances, any other information identified as first-level information as described herein, and/or as otherwise suitable.

In various embodiments, for added security to access the second level of information, an offline and/or online authentication protocol (as discussed herein) can be used in conjunction with the identification comparison, for enhanced security to access the first-level information or to access a second-level of information associated with access application 116, such as a social-security number, sensitive information as may be appropriate (such as health information if location 148 is a medical facility for example), to complete a payment transaction, to access any other information as defined as second-level information as discussed herein, or as otherwise suitable. In various embodiments, a scan of the user's fingerprint can be taken, e.g. utilizing any suitable scanner, such as scanner 138, and then the same or another scanner that is matched to the steganographic encoding technique associated with image 117b can scan and decrypt the fingerprint template associated with image 117b, and compare the derived fingerprint template from the scan of the user's finger to the decrypted template associated with 117b for a match. The match can be an additional requirement for accessing the first-level or second-level information or performing the activity associated therewith (e.g. a payment), or it can be a condition for accessing a third-level of information and/or for performing activity that has a higher level of security risk, such as performing a payment transaction in relation to access application 116 that exceeds a certain monetary threshold. In various embodiments, access to image 117b is contingent upon performing either one or both of the online and/or offline authentication protocols. In various embodiments, initiation of the offline and/or online protocol may be initiated by a first tap of the contactless card 101 on the mobile device, and the comparison of the fingerprint template associated with image 117b to a fingerprint template derived from a fingerprint from a subsequent scan of a user's finger can be based on a second tap of the contactless card 101 on the mobile device 110 or vice-versa. Additional conditions for accessing any level of information and/or performing a transaction in relation to access application 116, including comparing a user credential (e.g. username and password) to a stored user credential, as discussed below, and where the additional condition may be the first condition required to initiate a transaction and/or access any level of information with respect to access application 116.

Generally, in various embodiments described herein, an online verification or authentication protocol may include one or more of the following operations: the authentication application may initiate a transaction to verify an identity of a user, where the authentication application may initiate the application in whole or in part, e.g. access application 116 and/or utilize a steganographically encoded image 117b that can be scanned to access a feature of application 116 and/or complete a transaction in association therewith, by prompting the user to tap a contactless card 101 on a computer device, e.g. mobile device 110. The transaction may involve an NFC communication between a card reader 118 and a contactless card 101, where the contactless card 101 may provide the mobile device 110 with one or more inputs, including a latest version of an application transaction counter (ATC), and the contactless card 101 or the mobile device 110 (including any suitable components associated therewith) may generate a suitable cryptogram based on the plurality of inputs, and then the contactless card 101 or the mobile device 110 (including any suitable components associated therewith) may transmit the cryptogram and the ATC to an issuer of the contactless card 101 (e.g. a server 120 associated with the issuer). The user may then be verified and receive access to one or more features associated with application 116 by receiving a response from the issuer verifying or authorizing the user, where the received response is based on at least one cryptographic operations performed by the issuer (e.g. server 120) in response to receiving the cryptogram. In various embodiments, once the user is verified, the server 120 may transmit an authorization instruction to a suitable application, e.g. authentication application 114, to access the steganographically encoded image 117b stored in either the mobile device 110 and/or the contactless card for the purposes of performing an authenticating operation (e.g. fingerprint template comparison) in order to access one or more features of access application 116 and/or perform a transaction in association therewith.

Generally, in various embodiments described herein, an offline verification or authentication protocol may include one or more of the following operations: the authentication application 114, in order to provide access to one or more features of access application 116 to a user, may initiate an NFC communication between the mobile device 110 and the contactless card 101, and receive one or more inputs from the contactless card 101, where the communication may utilize a card reader 118. The authentication application 114 may facilitate receipt of a public key of a key pair from the contactless card 101 and cardholder identification information of an account holder (e.g. user) of the card. An application or component associated with the contactless card 101 and/or the authentication application 114 may instruct a component of the card 101 to generate a digital signature by using a private key of the key pair of the card, and the mobile device 110 may receive the digital signature from the card 101 and verify the signature using the public key. As described herein, the protocol may be initiated by one or more taps of the contactless card 101 on the mobile device 110. In various embodiments, once the user is verified, the authentication application 114 may access the steganographically encoded image 117b stored in either the mobile device 110 and/or the contactless card for the purposes of performing an authenticating operation (e.g. fingerprint template comparison) in order to access one or more features of access application 116 and/or perform a transaction in association therewith.

In various embodiments, a hybrid protocol may be utilized involving one or more operations of the online and offline protocol, where the online protocol may be initiated by a first or second tap of the contactless card 101 on the mobile device 110 and/or a first or second user credential comparison, and the offline protocol may be initiated by a first or second tap of the mobile device 110 on the contactless card 101 and/or a first or second user credential comparison, where the combination of offline and online protocols may be part of a single verification or authentication or where each may be associated with a partial verification or authentication.

In various embodiments, where the contactless card 101 is a virtual payment card, the authentication application 114 may retrieve information associated with the contactless card 101 by accessing a digital wallet implemented on the mobile device 110, where the digital wallet includes the virtual payment card.

As shown, the server 120 further includes a data store of account data 124 and a memory 122. The account data 124 includes account-related data for a plurality of users and/or accounts. The account data 124 may include at least a master key 105, counter 104, such as an application transaction counter ("ATC") 104 a customer ID 107, an associated contactless card 101, account holder name, account billing address, one or more shipping addresses, one or more virtual card numbers, and biographical information for each account. The memory 122 includes a management application 123 and instances of the card data 103, the counter 104, master key 105, and diversified key 106 for one or more accounts from the account data 124.

The system 100 is configured to implement key diversification to secure data, which may be referred to as a key diversification technique herein. The system 100 may implement an online authentication protocol or a hybrid online and offline authentication protocol. Both the online authentication protocol and hybrid offline and online authentication protocol may utilize one or more operations of the server 120.

In various embodiments, the authentication application 114 receives, from a user, a first application user credential associated with a user profile. The first application user credential may include biometrics data, an established gesture associated with user recognition, a username and password combination, and/or the like. The processor 119 compares the first application user credential with a stored second application user credential. The stored second application user credential may be associated with the user identity and it may be stored either in the memory 111 of mobile device 110 or in the memory 122 of the server 120. In various embodiments, the stored second application user credential is maintained on the server 120 and the first match is performed by the server 120. In various embodiments, upon determining a first match between the first application user credential and the stored second application user credential, the authentication application 114 may grant the user access to one or more first-level user account options and/or information of a user account associated with access application 116. The user account may be a financial account, a health insurance account, and/or any other account of the like associated with any service provider (e.g., a transit account, an entertainment account, etc.). Once the first match is determined, the user may access certain first-level user account options associated with access application 116, without utilizing the steganographically encoded image 117b and/or without performing additional operations associated with an online and/or offline authentication or verification protocol. In various embodiments, the first-level access can occur without or before completing a transaction, e.g. completion of a payment, in relation to access application 116, where completion of the payment requires an additional authentication, such as performing an online and/or offline authentication protocol and/or utilizing the steganographically encoded image 117b. The first-level user account options of a user account may include a display of an account balance, a display of recent transactions, and/or the like. For greater access and/or executing certain account functions, i.e., second-level user account options, as stated and implied, such as executing a payment transaction, a second-level of authentication may be required, such as fully completing an online and/or offline authentication protocol and/or utilizing the steganographically encoded image 117b.

Generally, the server 120 (or another computing device) and the contactless card 101 may be provisioned with the same master key 105 (also referred to as a master symmetric key). More specifically, each contactless card 101 is programmed with a distinct master key 105 that has a corresponding pair in the server 120. For example, when a contactless card 101 is manufactured, a unique master key 105 may be programmed into the memory 102 of the contactless card 101. Similarly, the unique master key 105 may be stored in a record of a customer associated with the contactless card 101 in the account data 124 of the server 120 (and/or stored in a different secure location). The master key may be kept secret from all parties other than the contactless card 101 and server 120, thereby enhancing security of the system 100.

The master keys 105 may be used in conjunction with the counters 104 to enhance security using key diversification. The counters 104 comprise values that are synchronized between the contactless card 101 and server 120. The counter value 104 may comprise a number that changes each time data is exchanged between the contactless card 101 and the server 120 (and/or the contactless card 101 and the mobile device 110). To enable NFC data transfer between the contactless card 101 and the mobile device 110, the account application 113 may communicate with the contactless card 101 when the contactless card 101 is sufficiently close to a card reader 118 (e.g. within NFC range) of the mobile device 110. Card reader 118 may be a digital reader with NFC capabilities, e.g. an NFC reader, and may be configured to read from and/or communicate with contactless card 101 (e.g., via NFC, Bluetooth, RFID, etc.). Therefore, example card readers 118 include NFC communication modules, Bluetooth communication modules, and/or RFID communication modules.

For example, a user may require authorization or verification to access an access application 116. One or more components of the system 100, including authentication application 114 may initiate a communication (e.g. API call or another suitable mechanism) with the access application 116 to utilize one or more payment protocols to verify or authenticate the user, whether the access application 116, or a particular aspect sought for access by the user of the access application 116, does or does not involve making a payment.

In various embodiments, the one or more protocols may involve online techniques as discussed elsewhere herein. The authentication application 114 may provide a user with a prompt so that the user may tap the contactless card 101 to the mobile device 110, thereby bringing the contactless card 101 sufficiently close to the card reader 118 of the mobile device 110 to enable NFC data transfer between the contactless card 101 and the card reader 118 of the mobile device 110. In various embodiments, the mobile device 110 may trigger the card reader 118 via an API call. In addition, and/or alternatively, the mobile device 110 may trigger the card reader 118 based on periodically polling the card reader 118. More generally, the mobile device 110 may trigger the card reader 118 to engage in communications using any feasible method.

In various embodiments, prior to initiating any communication in relation to the contactless card 101, the card reader 118, and the mobile device 110, and/or immediately after establishing a communication between the contactless card 101 and the card reader 118, the authentication application 114 may receive a first application user credential as a precondition for card activation and/or for commencing with the online or offline authentication protocol. A user may provide the first application user credentials after receiving a prompt from the authentication application to enter the credentials. As noted above, the first application user credentials may include biometrics data, an established gesture associated with user recognition, a username and password combination, facial recognition, and/or the like. As noted above, in various embodiments, the authentication application 114 communicates the first application user credentials to the processor 119. The processor 119 compares the first application user credentials with stored second application user credential. The stored second application user credential may be located within a memory 111 associated with the mobile device 110, the memory 102 associated with contactless card 101, and/or a memory 122 associated with the server 120. In various embodiments, the first application user credential is provided to the server 120, and the server 120 compares the first application user credential to the stored second application user credential. In various embodiments, as noted above, the processor 119 communicates the comparison result to the authentication application 114 (e.g., for a match). In various embodiments, a first match may initiate or serve as precondition for one or more of i) initiating the rest of the online verification protocol for verifying or authenticating the user to access the access application 116 and/or ii) granting the user access to first-level user account options of a user account associated with access application 116 (e.g., display of an account balance and/or recent transactions) and/or iii) utilizing the steganographically encoded image 117b to access one or more features associated with access application 116 and/or otherwise complete a transaction in association therewith, e.g. a payment transaction. As such, in various embodiments, responsive to finding a first match the verification authentication application initiates additional operations (associated with the online or offline verification process) to verify the user identity.

In various embodiments, the first match of the first application user credential to the stored second application user credential may or may not grant first-level access to an application, e.g. access application 116, but the first match serves may, in any event, serve as a precondition for initiating at least one of the online and/or offline protocols. In various embodiments where the first-level access was not granted initially, successful completion of the at least one online and/or offline protocol results in granting first-level access. In various embodiments, the second-level access to access application 116 is granted immediately upon completion of at least one of the online and/or offline verification protocols and/or utilizing the steganographically encoded image 117b, where the second-level access may refer to completing a payment transaction in relation to access application 116. In various embodiments, both a verification protocol and utilization of the steganographically encoded image 117b (e.g. decoding the fingerprint template associated therewith and comparing it to a derived fingerprint template from a fingerprint of a subsequent user finger scan) is required to access the second-level information and/or perform the transaction. In various embodiments, the offline and/or online protocols can suffice to grant access to a second-level information and/or a transaction meeting certain conditions, e.g. below a certain monetary threshold, but a third-level of information and/or a transaction with heightened security concerns, e.g. exceeding a certain monetary threshold, can require utilization of the steganographically encoded image 117b.

In various embodiments, additional preconditions may be applied as a condition of initiating either the offline and/or online protocol, such as commencing the offline authentication protocol only if there is a network failure preventing the online authentication from taking place.

In various embodiments, irrespective of any other preconditions, a first tap of the contactless card 101 on the mobile device 110 initiates one of the online and offline verification protocols and a second tap, subsequent tap, initiates the other one of the online and offline verification protocols.

In various embodiments, whether one or more preconditions is applied or takes place, after communication has been established between mobile device 110 and contactless card 101, the contactless card 101 generates a message authentication code (MAC) cryptogram. In various embodiments, this may occur when the contactless card 101 is read by the account application 113. In particular, this may occur upon a read, such as an NFC read, of a near field data exchange (NDEF) tag, which may be created in accordance with the NFC Data Exchange Format. For example, a reader, such as the account application 113 and/or the card reader 118, may transmit a message, such as an applet select message, with the applet ID of an NDEF producing applet. In various embodiments, the generated cryptogram may be an authorization request cryptogram (ARQC) consistent with an EMV standard.

In various embodiments, upon confirmation of the selection, a sequence of select file messages followed by read file messages may be transmitted. For example, the sequence may include "Select Capabilities file", "Read Capabilities file", and "Select NDEF file". At this point, the counter value 104 maintained by the contactless card 101 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message). In various embodiments, the MAC cryptogram may be transmitted as an NDEF tag, and in other examples the MAC cryptogram may be included with a uniform resource indicator (e.g., as a formatted string). The contactless card 101 may then transmit the MAC cryptogram to the mobile device 110, which may then forward the MAC cryptogram to the server 120 for verification as explained below. (However, in various embodiments discussed elsewhere herein, e.g. in an offline context, the mobile device 110 may verify the MAC cryptogram).

More generally, when preparing to send data (e.g., to the server 120 and/or the mobile device 110), the contactless card 101 may increment the counter value 104. The contactless card 101 may then provide the master key 105 and counter value 104 as input to a cryptographic algorithm, which produces a diversified key 106 as output. The cryptographic algorithm may include encryption algorithms, hash-based message authentication code (HMAC) algorithms, cipher-based message authentication code (CMAC) algorithms, and the like. Non-limiting examples of the cryptographic algorithm may include a symmetric encryption algorithm such as 3DES or AES128; a symmetric HMAC algorithm, such as HMAC-SHA-256; a symmetric CMAC algorithm such as AES-CMAC; and/or any other algorithm or technique consistent with any applicable version of ISO/IEC 1833 and/or ISO/IEC 7816. The contactless card 101 may then encrypt the data (e.g., the customer identifier 107 and any other data) using the diversified key 106. The contactless card 101 may then transmit the encrypted data (e.g., the encrypted customer ID 109) to the account application 113 of the mobile device 110 (e.g., via an NFC connection, Bluetooth connection, etc.). The account application 113 of the mobile device 110 may then transmit the encrypted data to the server 120 via the network 130. In at least various embodiments, the contactless card 101 transmits the counter value 104 with the encrypted data. In such embodiments, the contactless card 101 may transmit an encrypted counter value 104, or an unencrypted counter value 104.

Upon receiving the encrypted customer ID 109, the management application 123 of the server 120 may perform the same symmetric encryption using the counter value 104 as input to the encryption, and the master key 105 as the key for the encryption. As stated, the counter value 104 may be specified in the data received from the mobile device 110, or a counter value 104 maintained by the server 120 to implement key diversification for the contactless card 101. The output of the encryption may be the same diversified key value 106 that was created by the contactless card 101. The management application 123 may then decrypt the encrypted customer ID 109 received via the network 130 using the diversified key 106, which reveals the data transmitted by the contactless card 101 (e.g., at least the customer identifier 107). Doing so allows the management application 123 to verify the data transmitted by the contactless card 101 via the mobile device 110, e.g., by comparing the decrypted customer ID 107 to a customer ID in the account data 124 for the account.

Although the counter 104, e.g. ATC, is used as an example, other data may be used to secure communications between the contactless card 101, the mobile device 110, and/or the server 120. For example, the counter 104 may be replaced with a random nonce, generated each time a new diversified key 106 is needed, the full value of a counter value sent from the contactless card 101 and the server 120, a portion of a counter value sent from the contactless card 101 and the server 120, a counter independently maintained by the contactless card 101 and the server 120 but not sent between the two, a one-time-passcode exchanged between the contactless card 101 and the server 120, and a cryptographic hash of data. In various embodiments, one or more portions of the diversified key 106 may be used by the parties to create multiple diversified keys 106.

As shown, the server 120 may include one or more hardware security modules (HSM) 125. For example, one or more HSMs 125 may be configured to perform one or more cryptographic operations as disclosed herein. In various embodiments, one or more HSMs 125 may be configured as special purpose security devices that are configured to perform the one or more cryptographic operations. The HSMs 125 may be configured such that keys are never revealed outside the HSM 125, and instead are maintained within the HSM 125. For example, one or more HSMs 125 may be configured to perform at least one of key derivations, decryption, and MAC operations. The one or more HSMs 125 may be contained within, or may be in data communication with, server 120.

As stated, the key diversification technique may be used to perform secure operations using the contactless card 101. For example, once the management application 123 verifies the encrypted customer ID 109 using key diversification, the management application 123 may transmit a message to the authentication application 114 indicating that the user is verified and/or authenticated, and the authentication application 114 can grant the user access to the authentication application 116 as a result. In various embodiments, the output transmitted may include an authorization response cryptogram (ARPC).

As is inherent in one or more embodiments described herein, including the above discussion, the server 120 that may be used in an online authentication or verification or an online and offline hybrid operations may be configured to operate consistent with an EMV standard, including performing operations that utilize an EMV payment protocol for non-payment purposes. The host server (or system) 120 may be associated with an issuer of a card associated with a user, and the host system including a non-transitory computer-readable storage medium storing computer-readable program code executable by a processor, where the processor and storage medium may contain one or more hardware or software components, including those generally described in FIG. 8. The host system may be configured to receive a transaction data associated with an access application 116 and/or a contactless card 101. The receipt of the transaction data may be facilitated as described herein, e.g. by a authentication application 114 (or other suitable component or application of mobile device 110) associated with a mobile device 110 and the user (or other suitable computer device), where the authentication application 114 may initiate an authentication or verification transaction with one or more other components, e.g. a contactless card 101 and a card reader 118. The transaction data received by the server 120 from the authentication application 114. The transaction data may include i) a counter (e.g. ATC) and a cryptogram based on one or more inputs of the transaction and a symmetric key associated with the card. In various embodiments, the cryptogram is an authorization request cryptogram (ARQC).

In various embodiments, once the server 120 receives the transaction data, the management application 123 may transmit a response (e.g. from the issuer) to a suitable component of the mobile device 110, e.g. authentication application 114, verifying the identity of the user based on the received cryptogram and the authentication application 114 may grant access to a relevant portion or feature of access application 116 as a result and/or permit access to a steganographically encoded image 117b that can be utilized for completing a transaction associated with access application 116. In various embodiments, once the verification is completed, the authentication application 114 may authorize access to utilize a steganographically encoded image 117b, e.g. the steganographic application 117a can extract the fingerprint template from steganographically encoded image 117b and compare it to a fingerprint template derived from a user fingerprint scan using scanner 138, which, upon a successful match, can result in accessing one or more features associated with access application 116 and/or complete a transaction associated therewith.

In various embodiments, the server 120 may utilize the counter log 121 to perform an antifraud measure. In various embodiments, counter log 121 may include time stamps associated with the counter value associated with one or more non-payment transaction. In various embodiments, the counter log 121 may include time stamps associated with the counter value associated with one or more payment transactions. In various embodiments, the counter value of the ATC in relation to a particular transaction, e.g. whether it is a payment transaction or a non-payment transaction, may also be logged. The management application 123 may be configured to compare a general number of payment transactions that take place in between non-payment transactions. If the number of payment transactions after a non-payment transaction exceeds a certain threshold, the management application 123 may deny the payment transactions, even if otherwise the transaction may be completed (e.g. since it is assumed that a user may use the payment protocol for non-payment and payment protocol, an unduly large number of payment transactions after a non-payment transactions may be considered fraudulent). In various embodiments, the opposite may be implemented, e.g. a large number of non-payment transactions being performed after a payment transaction in excess of a threshold may cause the management application 123 to deny a certain non-payment transaction when the verification or authentication takes place. In various embodiments, a threshold in relation to time between any transaction, e.g. payment or non-payment, in terms of exceeding a minimum or maximum threshold may cause the management application 123 to deny the authentication or verification operation. The counter log 121 may be used to perform any other suitable operation, including perform an anti-fraud measure in any other suitable manner. In various embodiments, the anti-fraud measure can override an authorized transaction irrespective of the level of security employed, e.g. performing one or both of an online and offline authorization protocol, in addition to utilizing the steganographically encoded image 117b in a comparison context.

In addition to the one or more online operations outlined herein and above, the system 100 can facilitate one or offline operations to verify or authenticate a user offline, where, in various embodiments, the offline operations are used in combination with an online technique, and where in various embodiments the offline operations may be used based on a precondition, e.g. if a network failure prevents use of the one or more online operations.

In various embodiments, in a similar fashion as discussed in relation to the embodiments described herein with respect to the online verification technique, the authentication application 114 receives the first application user credentials in order to access one or more aspects or feature of authentication application 116, where the offline verification or authentication technique may utilize a payment protocol consistent with an EMV standard for purposes other than to complete a payment transaction. A user may provide the first application user credentials after receiving a prompt from the authentication application. The first application user credentials may include biometrics data, an established gesture associated with user recognition, a username and password combination, facial recognition, and/or the like. In various embodiments, the authentication application 114 communicates the first application user credentials to the processor 119. The processor 119 compares the first application user credentials with stored second application user credential. The stored second application user credential may be located within a memory 111 associated with the mobile device 110 or with a memory 102 of contactless card 101.

In various embodiments, the processor 119 communicates the comparison result to the authentication application 114 (e.g., for a match). In various embodiments, a first match may grant the user access to first-level aspects, e.g. user account options of a user account, associated with authentication application 116 (e.g., display of an account balance and/or recent transactions). Responsive to finding a first match, the authentication application 114 initiates verifying or authenticating a user identity with one or more offline operations. For example, the authentication application 114 may output for display on the mobile device 110 a notification to bring a contactless card 101 near the mobile device 110. The authentication application 114 may then communicate with the contactless card 101 (e.g., after being brought near the contactless card 101). Communication between the authentication application 114 and the contactless card 101 may involve the contactless card 101 being sufficiently close to the card reader 118 of the mobile device 110 to enable NFC data transfer between the authentication application 114 and the contactless card 101. In various embodiments, the contactless card 101 sends, to the authentication application 114, or another suitable component or application of the mobile device 110, a public key of a public/private key pair and cardholder identification information of an account holder of the card, e.g. the user to be verified or authenticated in relation to access application 116. In various embodiments, the authentication application 114, may instruct the contactless card 101 to generate a digital signature using a private key of the key pair of the card. In various embodiments, the cardholder identification information may be incorporated within the digital signature or otherwise conveyed with the digital signature.

In various embodiments, the contactless card 101 sends the digital signature to the authentication application 114 or another suitable component or application of the mobile device 110. In various embodiments, the authentication application 114 may communicate the digital signature with the processor 119, where the processor 119 may verify the digital signature using the public key. For example, the contactless card 101 may provide a hash of the card's public key encrypted by a trusted source (e.g., a private key of a card provider), and verifying the digital signature may include: decrypting the encrypted hash (e.g., with a public key of the card provider); calculating a new hash of the digital signature; and comparing the decrypted original hash to the new hash for a match, at which point the card provider (e.g., issuer), and the transaction card may be authenticated. In various embodiments, once the transaction card is authenticated, the authentication application 114 may authorize access to utilize a steganographically encoded image 117b, e.g. the steganographic application 117a can extract the fingerprint template from steganographically encoded image 117b and compare it to a fingerprint template derived from a user fingerprint scan using scanner 138, which, upon a successful match, can result in accessing one or more features associated with access application 116 and/or complete a transaction associated therewith.

In various embodiments, as discussed and implied elsewhere herein, the offline authentication may be used when authentication application 114 determines a network failure associated with network 130 is present or for some other reason access to the server 120 is not possible, otherwise, the online authentication is used to authenticate the user and to facilitate use of the steganographically encoded image 117b. In various embodiments, the offline and online techniques may run in sequence for added security and in order to facilitate use of the steganographically encoded image 117b.

In various embodiments, either the mobile device 110 and/or the contactless card 101 may be configured to perform an antifraud measure utilizing a counter log 121 (not expressly shown with respect to the mobile device 110).

In various embodiments, e.g. when both the online and offline techniques are implemented, verifying the digital signature may be performed by a server, e.g. server 120, connected to the mobile device 110, e.g. connected by network 130. For example, processor 119 may output the digital signature for transmission to server 120, and server 120 may verify the digital signature.

Figure 2:
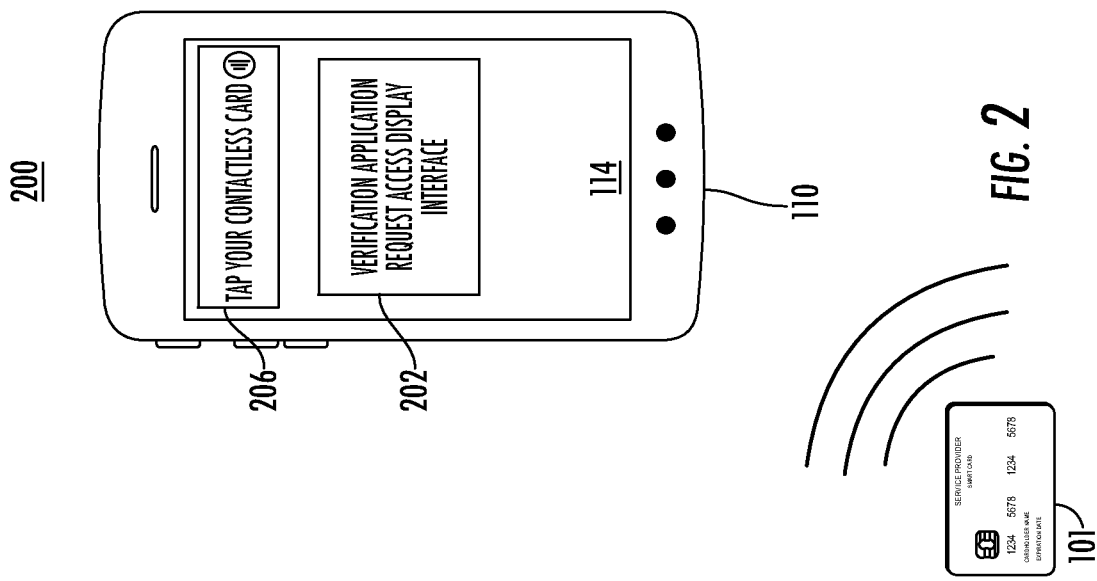
FIG. 2 illustrates at least one embodiments of tapping to verify a user utilizing an authentication protocol.

FIG. 2 is a schematic 200 depicting an example embodiment of tapping to initiate an online verification and/or offline authentication protocol to utilize a steganographically encoded image for accessing a feature and/or completing a transaction in relation to access application 116. A graphical user interface (GUI) of the authentication application 114 on the mobile device 110 may include a prompt 206 to tap the contactless card 101 to initiate an authentication or verification for another application, e.g. access application 116, where a separate API interface may be provided to communicate the verification or authentication (once completed) to the access application 116 by the authentication application 114. In various embodiments, the access application 116 provides a prompt 202 as a precondition for receiving the tap prompt 206 or after the tap takes place, but prior to any additional online or offline verification operations, to enter user credentials for comparison (e.g. as described with reference to FIG. 1) for a first-level and/or second-level of information access in relation to access application 116. In various embodiments, authentication application 114 provides an interface for the prompt 202 for entering the user credential with respect to access application 116 and/or any other application, e.g. other applications 115.

In various embodiments, once the contactless card 101 is tapped to the mobile device 110, the authentication application 114 transmits, via the card reader 118 (e.g., via NFC, Bluetooth, RFID, etc.), an indication to the contactless card 101. In various embodiments, the indication may specify to perform one or more encryption techniques as described with respect to FIG. 1. In various embodiments, an online authentication technique is used, and the authentication application 114 receives transaction data from the server 120. In various embodiments, an offline authentication technique is used, and the authentication application 114 and the contactless card 101 utilize public/private key encryption techniques to authenticate the user. In various embodiments, the prompt to transmit data between the contactless card 101 and the mobile device 110 may specify to transmit the data to the authentication application 114 via any suitable protocol consistent with an EMV protocol or standard, where in various embodiments the authentication application 114 receives any suitable data directly from the contactless card 101 via a protocol consistent with an EMV protocol or standard.

Figure 3:
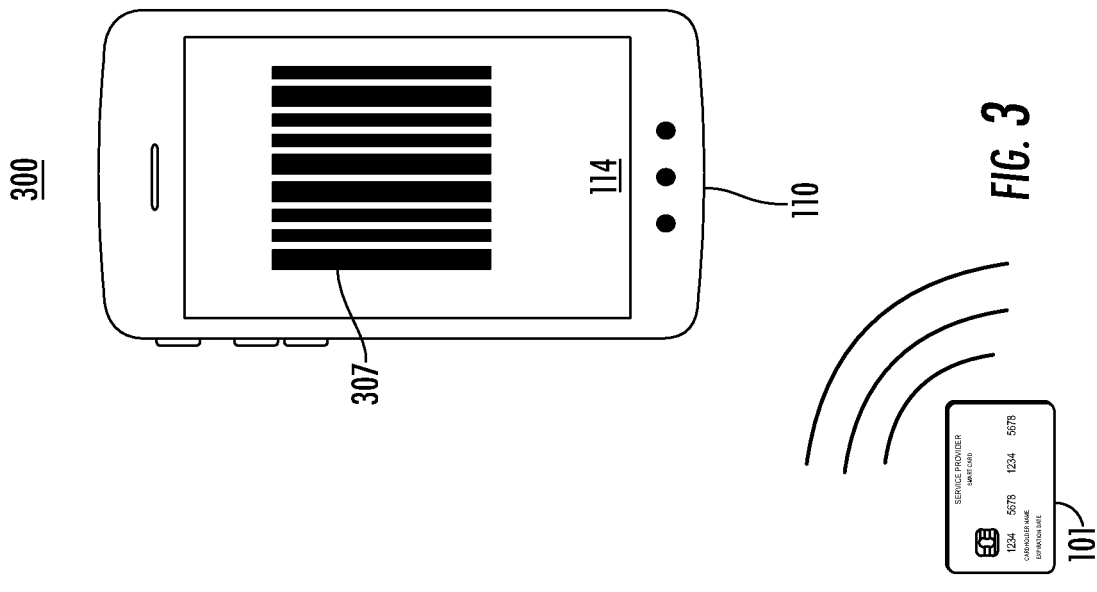
FIG. 3 illustrate at least one embodiment of utilizing a steganographic image based on the tapping and verification of FIG. 2.

FIG. 3 is a schematic 300 depicting an example embodiment of utilizing a steganographically encoded image after tapping to initiate an online verification and/or offline authentication protocol, e.g. for accessing a feature and/or completing a transaction in relation to access application 116, takes place. Whether an online verification or authentication that includes utilizing a server 120 is used to perform the authentication or verification of the user, whether an offline verification that includes utilizing the mobile device 110, the contactless card 101 and/or card reader 118 is used to perform the authentication or verification of the user without the server 120, and/or whether a hybrid offline and online verification that includes utilizing a mobile device 110, a card reader 118, a contactless card 101, and/or a server 120 is used to perform the authentication or verification of the user, a steganographic image 307 is generated on the display of the mobile device that is suitable for scanning by any suitable scanning device. The steganographic image 307 can have a visible portion, e.g. a government identification, and an encoded portion, e.g. a fingerprint template of the user, that can be ascertained only if scanned by a suitable scanner with a decoding or decrypting operation that is suitable to decode or decrypt the fingerprint template in relation to the steganographic encryption employed to steganographically encrypt the fingerprint template to the government identification. Once decrypted, the fingerprint template can be compared to another fingerprint template associated with the user to grant access to the user to any aspects of access application 116 and/or to complete a transaction in relation thereto. The steganographic image 307 can be created by a certification process at a facility, e.g. facility 146, as described herein, and server 120 can be notified of this certification (without necessarily requiring the image 117b to be uploaded to the server), such that utilization of the image 117b can be recognized as authentic and appropriate by the issuer associated with server 120, including the management application 123 authorizing one or more operations in relation to access application 116 (when an online authentication protocol is used) once authentication application 114 communicates that a successful template comparison has been performed by steganographic encoding application 117a.

Figure 4A:
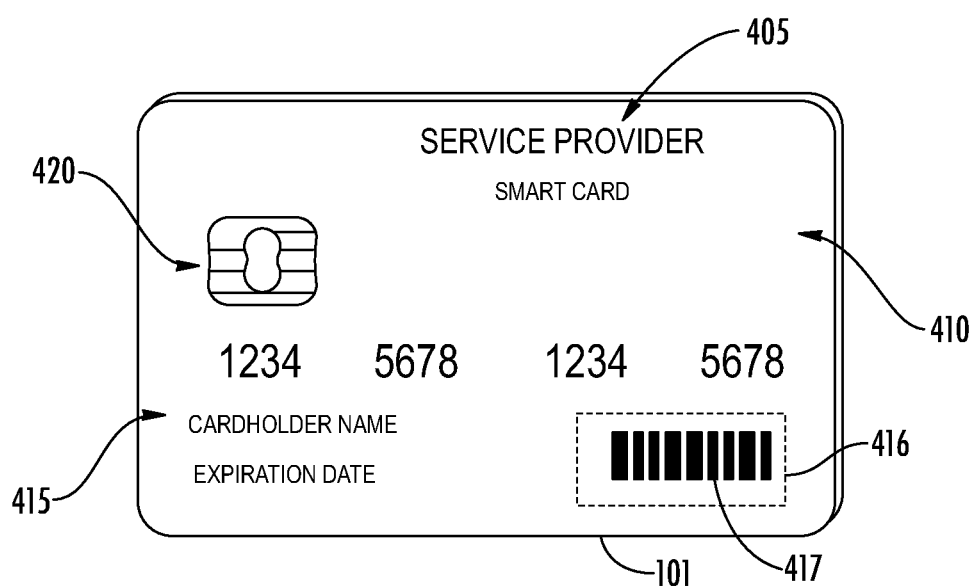
FIGS. 4A-4B illustrate an example contactless card.

FIG. 4A illustrates a contactless card 101, which may comprise a payment card, such as a credit card, debit card, and/or a gift card. As shown, the contactless card 101 may be issued by a service provider 405 displayed on the front or back of the card 101. In various embodiments, the contactless card 101 is not related to a payment card, and may comprise, without limitation, an identification card. In various embodiments, the payment card may comprise a dual interface contactless payment card. The contactless card 101 may comprise a substrate 410, which may include a single layer, or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In various embodiments, the contactless card 101 may have physical characteristics compliant with the ID-1 format of the ISO/IEC 7810 standard, and the contactless card may otherwise be compliant with the ISO/IEC 14443 standard. However, it is understood that the contactless card 101 according to the present disclosure may have different characteristics, and the present disclosure does not require a contactless card to be implemented in a payment card.

The contactless card 101 may also include identification information 415 displayed on the front and/or back of the card, and a contact pad 420. The contact pad 420 may be configured to establish contact with another communication device, such as the mobile devices 110, a user device, smart phone, laptop, desktop, or tablet computer. The contactless card 101 may also include processing circuitry, antenna and other components not shown in FIG. 4A. These components may be located behind the contact pad 420 or elsewhere on the substrate 410. The contactless card 101 may also include a magnetic strip or tape, which may be located on the back of the card (not shown in FIG. 4A). The contactless card 101 may include a display interface 416 which can display a steganographic image 417. The display interface 416 may correspond to the display 141 depicted in FIG. 1A. The steganographic image 417 can have a visible portion, e.g. a government identification, and an encoded portion, e.g. a fingerprint template of the user, that can be ascertained only if scanned by a suitable scanner with a decoding or decrypting operation that is suitable to decode or decrypt the fingerprint template in relation to the steganographic encryption employed to steganographically encrypt the fingerprint template to the government identification. Once decrypted, the fingerprint template can be compared to another fingerprint template associated with the user to grant access to the user to any aspects of access application 116 and/or to complete a transaction in relation thereto. The steganographic image 417 can be created by a certification process at a facility, e.g. facility 146, as described herein, and server 120 can be notified of this certification (without necessarily requiring the image 117b to be uploaded to the server), such that utilization of the image 117b can be recognized as authentic and appropriate by the issuer associated with server 120, including the management application 123 authorizing one or more operations in relation to access application 116 (when an online authentication protocol is used) once authentication application 114 communicates that a successful template comparison has been performed by steganographic encoding application 117a.

Figure 4B:
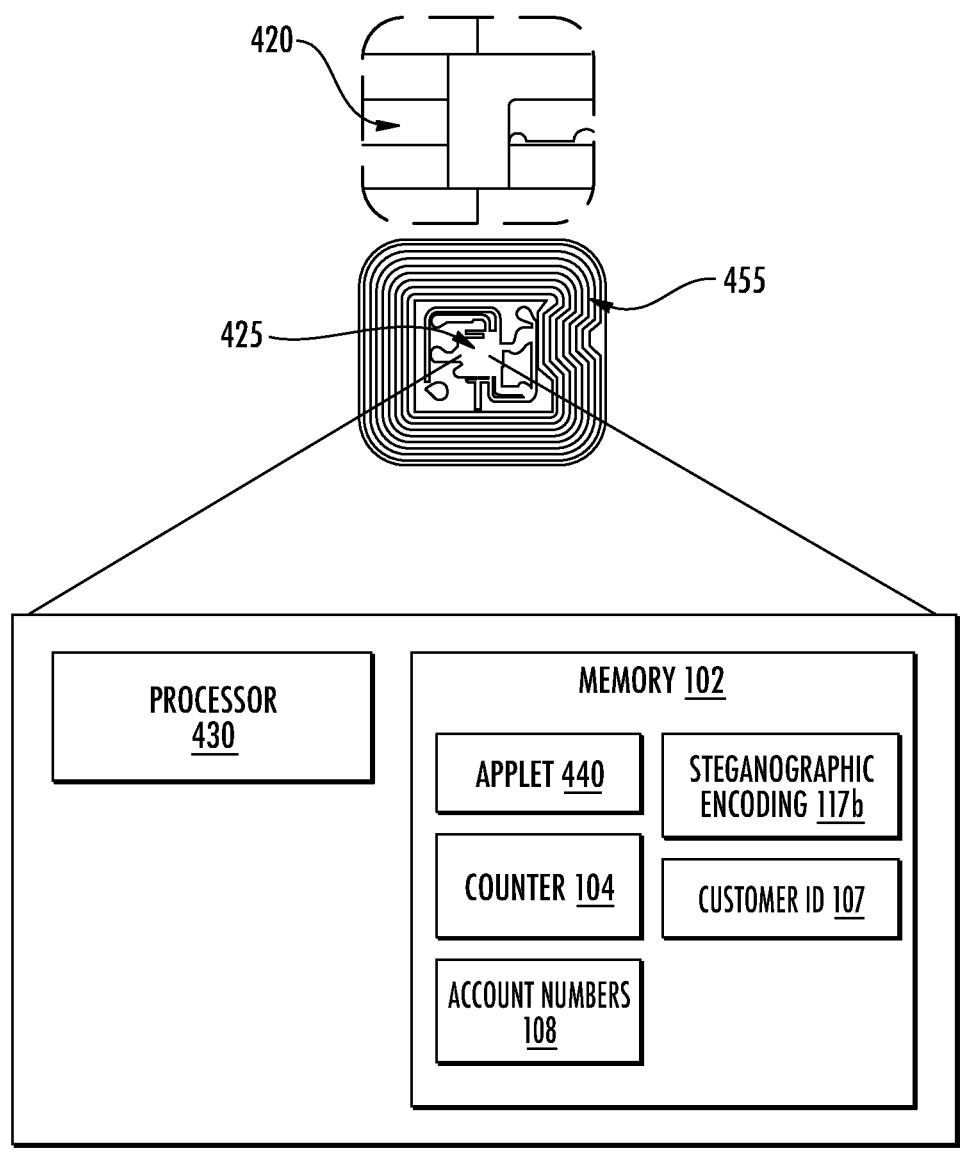

As illustrated in FIG. 4B, the contact pad 420 of contactless card 101 may include processing circuitry 425 for storing and processing information, including a microprocessor 430 and the memory 102. It is understood that the processing circuitry 425 may contain additional components, including processors, memories, error and parity/CRC checkers, data encoders, anti-collision algorithms, controllers, command decoders, security primitives and tamper proofing hardware, as necessary to perform the functions described herein.

The memory 102 may be a read-only memory, write-once read-multiple memory or read/write memory, e.g., RAM, ROM, and EEPROM, and the contactless card 101 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory.

The memory 102 may be configured to store one or more applets 440, one or more counters 104, a customer identifier 107, and the virtual account numbers 108. The one or more applets 440 may comprise one or more software applications configured to execute on one or more contactless cards, such as a Java® Card applet. However, it is understood that applets 440 are not limited to Java Card applets, and instead may be any software application operable on contactless cards or other devices having limited memory. The one or more counters 104 may comprise a numeric counter sufficient to store an integer. The customer identifier 107 may comprise a unique alphanumeric identifier assigned to a user of the contactless card 101, and the identifier may distinguish the user of the contactless card from other contactless card users. In various embodiments, the customer identifier 107 may identify both a customer and an account assigned to that customer and may further identify the contactless card associated with the customer's account. As stated, the account numbers 108 may include thousands of one-time use virtual account numbers associated with the contactless card 101. An applet 440 of the contactless card 101 may be configured to manage the account numbers 108. The memory 102 can be configured to contain a steganographic encoding 117b which can be displayed, e.g. as shown and discussed in FIG. 4A, and that can be scanned and decrypted by any suitable scanning device and for any suitable purpose as described herein.

The processor and memory elements of the foregoing exemplary embodiments are described with reference to the contact pad, but the present disclosure is not limited thereto. It is understood that these elements may be implemented outside of the pad 420 or entirely separate from it, or as further elements in addition to processor 430 and memory 102 elements located within the contact pad 420.

In various embodiments, the contactless card 101 may comprise one or more antennas 455. The one or more antennas 455 may be placed within the contactless card 101 and around the processing circuitry 425 of the contact pad 420. For example, the one or more antennas 455 may be integral with the processing circuitry 425 and the one or more antennas 455 may be used with an external booster coil. As another example, the one or more antennas 455 may be external to the contact pad 420 and the processing circuitry 425.

In an embodiment, the coil of contactless card 101 may act as the secondary of an air core transformer. The terminal may communicate with the contactless card 101 by cutting power or amplitude modulation. The contactless card 101 may infer the data transmitted from the terminal using the gaps in the contactless card's power connection, which may be functionally maintained through one or more capacitors. The contactless card 101 may communicate back by switching a load on the contactless card's coil or load modulation. Load modulation may be detected in the terminal's coil through interference. More generally, using the antennas 455, processing circuitry 425, and/or the memory 102, the contactless card 101 provides a communications interface to communicate via NFC, Bluetooth, and/or Wi-Fi communications.

As explained above, contactless cards 101 may be built on a software platform operable on smart cards or other devices having limited memory, such as JavaCard, and one or more or more applications or applets may be securely executed. Applets 440 may be added to contactless cards to provide a one-time password (OTP) for multifactor authentication (MFA) in various mobile application-based use cases. Applets 440 may be configured to respond to one or more requests, such as near field data exchange requests, from a reader, such as a mobile NFC reader (e.g., of the mobile device 110), and produce an NDEF message that comprises a cryptographically secure OTP encoded as an NDEF text tag.

One example of an NDEF OTP is an NDEF short-record layout (SR=1). In such an example, one or more applets 440 may be configured to encode the OTP as an NDEF type 4 well known type text tag. In various embodiments, NDEF messages may comprise one or more records. The applets 440 may be configured to add one or more static tag records in addition to the OTP record.

In various embodiments, the one or more applets 440 may be configured to emulate an RFID tag. The RFID tag may include one or more polymorphic tags. In various embodiments, each time the tag is read, different cryptographic data is presented that may indicate the authenticity of the contactless card. Based on the one or more applications, an NFC read of the tag may be processed, the data may be transmitted to a server, such as the server 120, and the data may be validated at the server.

In various embodiments, the contactless card 101 and server 120 may include certain data such that the card may be properly identified. The contactless card 101 may comprise one or more unique identifiers (not pictured). Each time a read operation takes place, the counters 104 may be configured to increment. In various embodiments, each time data from the contactless card 101 is read (e.g., by a mobile device 110), the counter 104 is transmitted to the server for validation and determines whether the counter values 104 are equal (as part of the validation).

The one or more counters 104 may be configured to prevent a replay attack. For example, if a cryptogram has been obtained and replayed, that cryptogram is immediately rejected if the counter 104 has been read or used or otherwise passed over. If the counter 104 has not been used, it may be replayed. In various embodiments, the counter that is incremented on the card is different from the counter that is incremented for transactions. The contactless card 101 is unable to determine the application transaction counter 104 since there is no communication between applets 440 on the contactless card 101. In various embodiments, the contactless card 101 may comprise a first applet 440-1, which may be a transaction applet, and a second applet 440-2. Each applet 440-1 and 440-2 may comprise a respective counter 104.

In various embodiments, the counter 104 may get out of sync. In various embodiments, to account for accidental reads that initiate transactions, such as reading at an angle, the counter 104 may increment but the application does not process the counter 104. In various embodiments, when the mobile device 110 is woken up, NFC may be enabled and the device 110 may be configured to read available tags, but no action is taken responsive to the reads.

To keep the counter 104 in sync, an application, such as a background application, may be executed that can be configured to detect when the mobile device 110 wakes up and synchronize with the server 120 indicating that a read that occurred due to detection to then move the counter 104 forward. In other examples, Hashed One Time Password may be utilized such that a window of mis-synchronization may be accepted. For example, if within a threshold of 10, the counter 104 may be configured to move forward. But if within a different threshold number, for example within 10 or 1000, a request for performing re-synchronization may be processed which requests via one or more applications that the user tap, gesture, or otherwise indicate one or more times via the user's device. If the counter 104 increases in the appropriate sequence, then it possible to know that the user has done so.

The key diversification technique described herein with reference to the counter 104, master key 105, and diversified key 106 is one example of encryption and/or decryption a key diversification technique. This example key diversification technique should not be considered limiting of the disclosure, as the disclosure is equally applicable to other types of key diversification techniques.

During the creation process of the contactless card 101, two cryptographic keys may be assigned uniquely per card. The cryptographic keys may comprise symmetric keys which may be used in both encryption and decryption of data. Triple DES (3DES) algorithm may be used by EMV and it is implemented by hardware in the contactless card 101. By using the key diversification process, one or more keys may be derived from a master key based upon uniquely identifiable information for each entity that requires a key.

In various embodiments, to overcome deficiencies of 3DES algorithms, which may be susceptible to vulnerabilities, a session key may be derived (such as a unique key per session) but rather than using the master key, the unique card-derived keys and the counter may be used as diversification data. For example, each time the contactless card 101 is used in operation, a different key may be used for creating the message authentication code (MAC) and for performing the encryption. This results in a triple layer of cryptography. The session keys may be generated by the one or more applets and derived by using the application transaction counter with one or more algorithms (as defined in EMV 4.3 Book 2 A1.3.1 Common Session Key Derivation).

Further, the increment for each card may be unique, and assigned either by personalization, or algorithmically assigned by some identifying information. For example, odd numbered cards may increment by 2 and even numbered cards may increment by 5. In various embodiments, the increment may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In another example, the NDEF record may be encoded in hexadecimal format.

Figure 5:
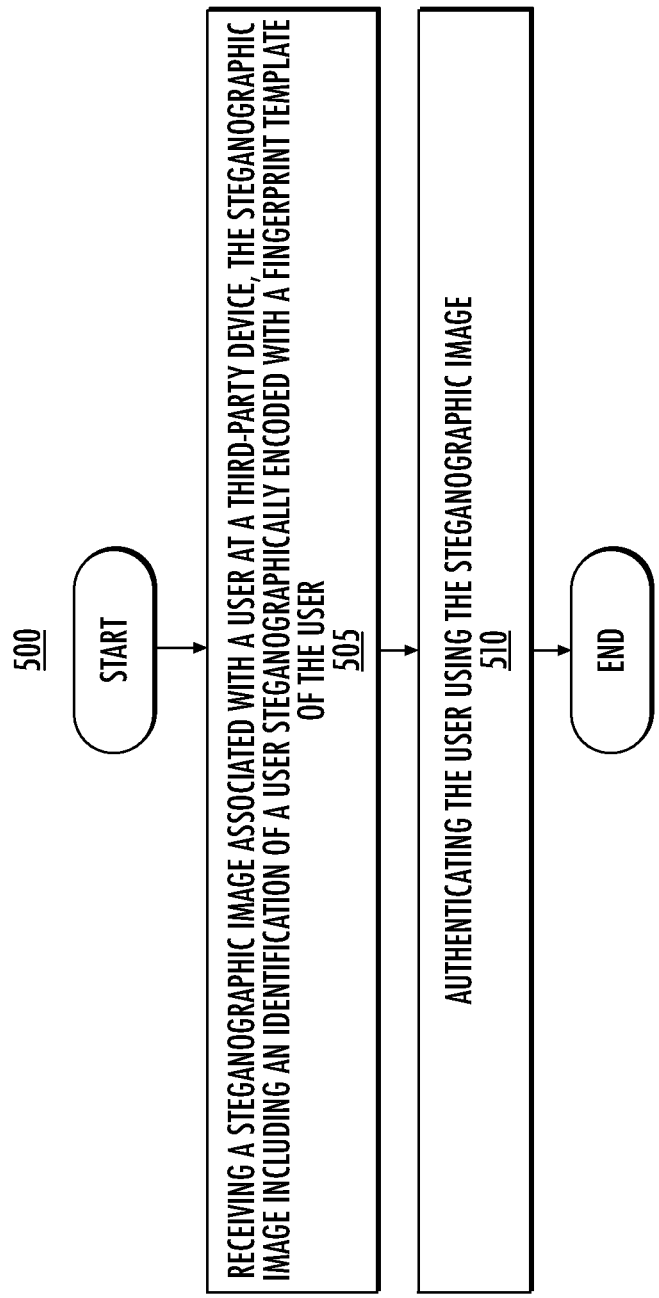
FIG. 5 illustrates an embodiment of a first logic flow.

FIG. 5 illustrates an embodiment of a logic flow 500. The logic flow 500 may be representative of some or all of the operations executed by one or more embodiments described herein. For example, the logic flow 500 may include some or all of the operations to create a steganographically encoded image of an identification of the user with a fingerprint template of the user thereon. Embodiments are not limited in this context.

As shown, logic flow 500 begins at block 505, where one or more of any suitable component, operation, or system or unit can be used to create a steganographically encoded image 117b. For example, a steganographic application 117a in conjunction with a scanner 138 can create the image 117b. The scanner 138 can an identification of a user, such as government identification (passport or driver's license) and a fingerprint of a user by scanning a finger of the user. The steganographic application may apply any suitable steganographic operations as discussed herein or otherwise suitable to encode a fingerprint template of the user on an image of the government identification. The image of the government identification, which is part of the overall steganographic image 117b, can be verified and confirmed at a facility associated with an issuer as discussed herein and the steganographic encoding can also be performed at a facility associated with an issuer and using a verification device at the facility. The verification device can be the mobile device 110 of the user containing a steganographic application 117a as presented to an associated working or otherwise affiliated with the issuer facility or it can be another computer device with a suitable steganographic encoding ability located at the issuer facility or otherwise associated therewith, including transmitting the government identification and the fingerprint or fingerprint template to a server 120 associated with the issuer, where the server 120 can be configured to extract a fingerprint template from the scanned fingerprint of the user and steganographically encode the fingerprint template on an image of the government identification and then store the steganographic image 117b in a memory of a mobile device 110, contactless card 101, and/or the server 120 for subsequent use in a verification operation. In various embodiments, including but not limited to situations where privacy is a concern, the certification and steganographic encoding can happen using a local device, such as a mobile device 110, without transmitting the steganographic image 117b to the server 120. In various embodiments, where the server 120 does not have a stored version of the steganographic image 117b, an application associated with a device that contains the steganographic image, e.g. the authentication application 114 of mobile device 110 can notify a suitable application 123 of server 120 that a certification and steganographic encoding has taken place so as to enable the server 120 to authorize use of a steganographic comparison to authorize an access to one or more features associated with access application 116 and/or to complete a transaction associated therewith. At block 510, the steganographically encoded image 117b can be used by itself or with other security features (as discussed herein or otherwise suitable) to authenticate the user and provide access to one or more features of access application 116, including decoding the fingerprint template associated with image 117b and comparing it to a derived fingerprint template of a subsequent fingerprint scan associated with the user.

FIG. 6 illustrates an embodiment of a logic flow 600. The logic flow 600 may be representative of some or all of the operations executed by one or more embodiments described herein. For example, the logic flow 600 may include some or all of the operations to certify an identification of a user as authentic, create a steganographically encoded image of an identification of the user with a fingerprint template of the user thereon, certify the authenticity of the steganographically encoded image 117b, and/or utilize the steganographically encoded image 117b to provide an access to one or more features of access application 116 and/or authorize a transaction in relation therewith. Embodiments are not limited in this context.

As shown, the logic flow 600 begins at block 610, where at least one verification device can verify and certify the authenticity of an identification associated with a user. In various embodiments, the verification device can be one or more devices associated with one or both of a user and an issuer, e.g. a mobile device 110 and a server 120, and in other embodiments all of the verification devices can be devices located at a facility 146 associated with an issuer. At the facility 146 associated with an issuer, a user can present a government identification to an associate of the facility 146. The associate 147 can communicate or utilize a device associated with the issuer, such as a server 120 to verify and certify the authenticity of the image. For example, a computer device at the facility may communicate with the server 120 using a suitable application of the server, such as confirmation application 126. Confirmation application 126 can access a public records facility and transmit information associated with the user, including an official copy of the government identification from a public record, and the local computer device can compare the official copy to the presented copy and determine it is authentic. In various embodiments, account data 124 includes a public records database, and in other embodiments a different database (not shown) is used. Alternatively, a confirmation application that is part of other applications 115 or another local device specific to the facility may perform a scan using an appropriate scanning device, e.g. an identification scanning device that confirms the authenticity of a government identification to a presented identification by scanning it and receiving a verification from an appropriate government identification, without utilizing a server 120 to perform the certification. In various embodiments, even if server 120 is not used to perform the certification, the appropriate application, e.g. authentication application 114, can communicate to the server 120 that a certification has successfully taken place. Once the government identification has been verified, a scan of an image of the government identification can be taken at facility 146 using any suitable scanner or image processing device.

At block 615, utilizing any of the steganographic techniques discussed herein (or otherwise suitable) an associate at the facility 146 can steganographically encode a fingerprint template on the image of the government identification, including by utilizing fingerprint scanner 138 to obtain fingerprint scan of the user and derive a fingerprint template therefrom, and then utilize steganographic application 117a to perform a steganographic encoding of the template on the government identification to produce steganographically encoded image 117b. At block 620, the steganographically encoded image 117b can be transmitted or stored to any suitable memory of any suitable device, including contactless card 101, mobile device 110, and/or server 120 for use in an authorization operation to access one or more features associated with access application 116 and/or to complete a payment transaction associated therewith. For example, a decoding of the fingerprint template can be performed by fingerprint scanner 138 and/or steganographic application 117a or any other suitable scanner, device, or application, and compared to an extracted fingerprint template associated with a subsequent fingerprint obtained from another scan of the user's finger, where the other scan is initiated or requested when the authentication application 114 determines that one or more features of access application 116 are attempted for access by a user.

Figure 7A:
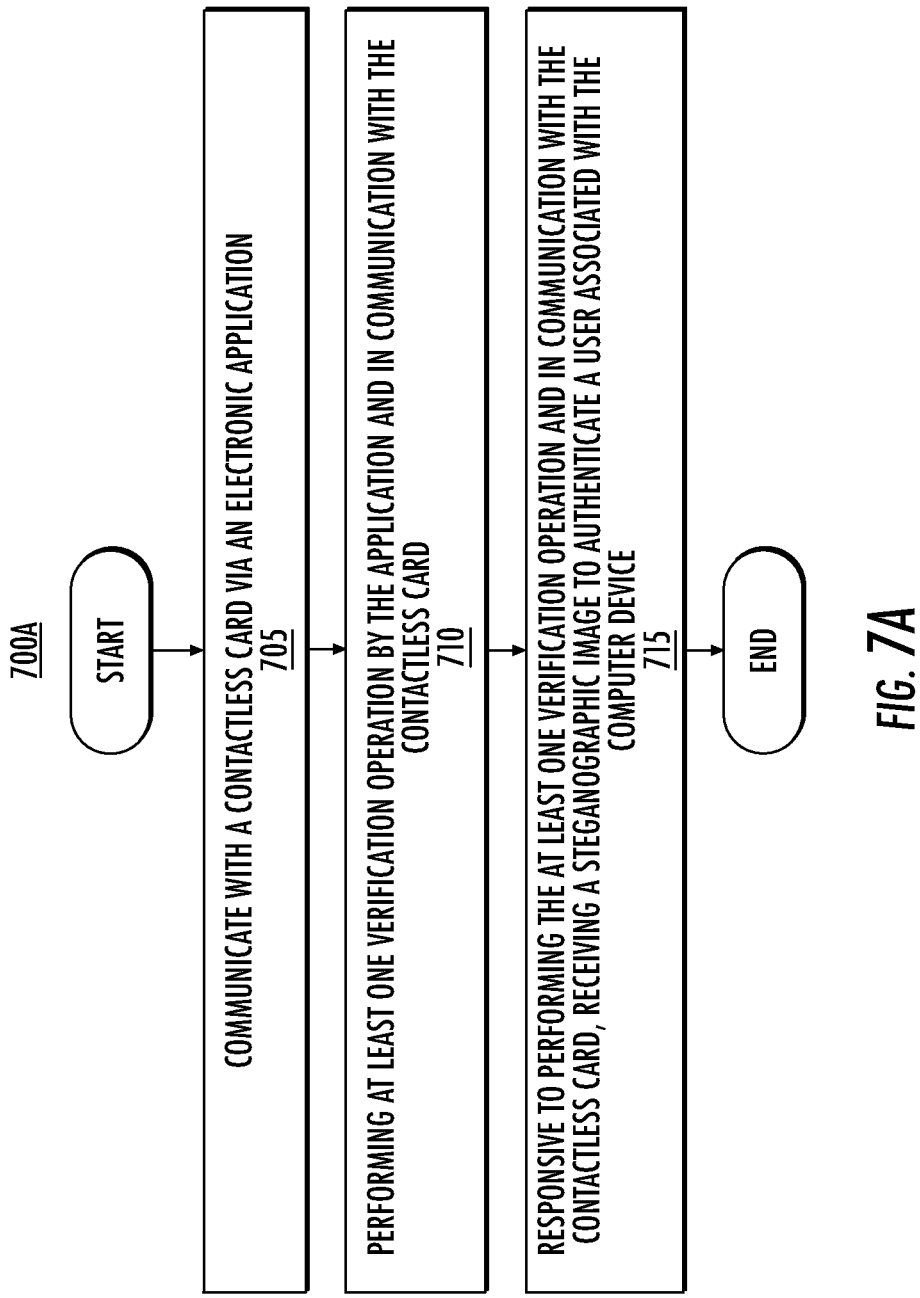
FIG. 7A illustrates an embodiment of a third logic flow.

FIG. 7A illustrates an embodiment of a logic flow 700A. The logic flow 700 may be representative of some or all of the operations executed by one or more embodiments described herein. For example, the logic flow 700A may include some or all of the operations to verify or authenticate a user utilizing an online or offline authentication technique and a steganographically encoded image. Embodiments are not limited in this context.

As shown, the logic flow 700A begins at block 705, where at least one of the authentication application 114, the OS 112, the management application 123, and/or any other suitable application may initiate a transaction to verify an identity of a user and utilize a steganographic image 117b to obtain access to one or more features of access application 116 and/or complete a transaction associated therewith. In various embodiments, the verification may commence by tapping the contactless card 101 on the mobile device 110. In various embodiments, the access application 116 provides a prompt with a precondition for receiving the tap prompt or immediately after the tap takes place, but prior to any additional online verification operations, to enter user credentials for comparison for a first-level and/or second-level of information access in relation to access application 116, where the nature of the first-level features is described elsewhere herein. In various embodiments, the user credential is associated with a user profile and entered into an interface provided by the mobile device 110, where, as stated, the first application user credential may include biometrics data, an established gesture associated with user recognition, a username and password combination, and/or the like. The first application user credential may be transmitted by the authentication application 114 to the management application 123 of the server 120, where the first application user credential is compared to a stored second credential. If the comparison results in a match of the first and second credentials, the management application 123 may transmit an indication of the match to the authentication application 114.

Figure 7B:
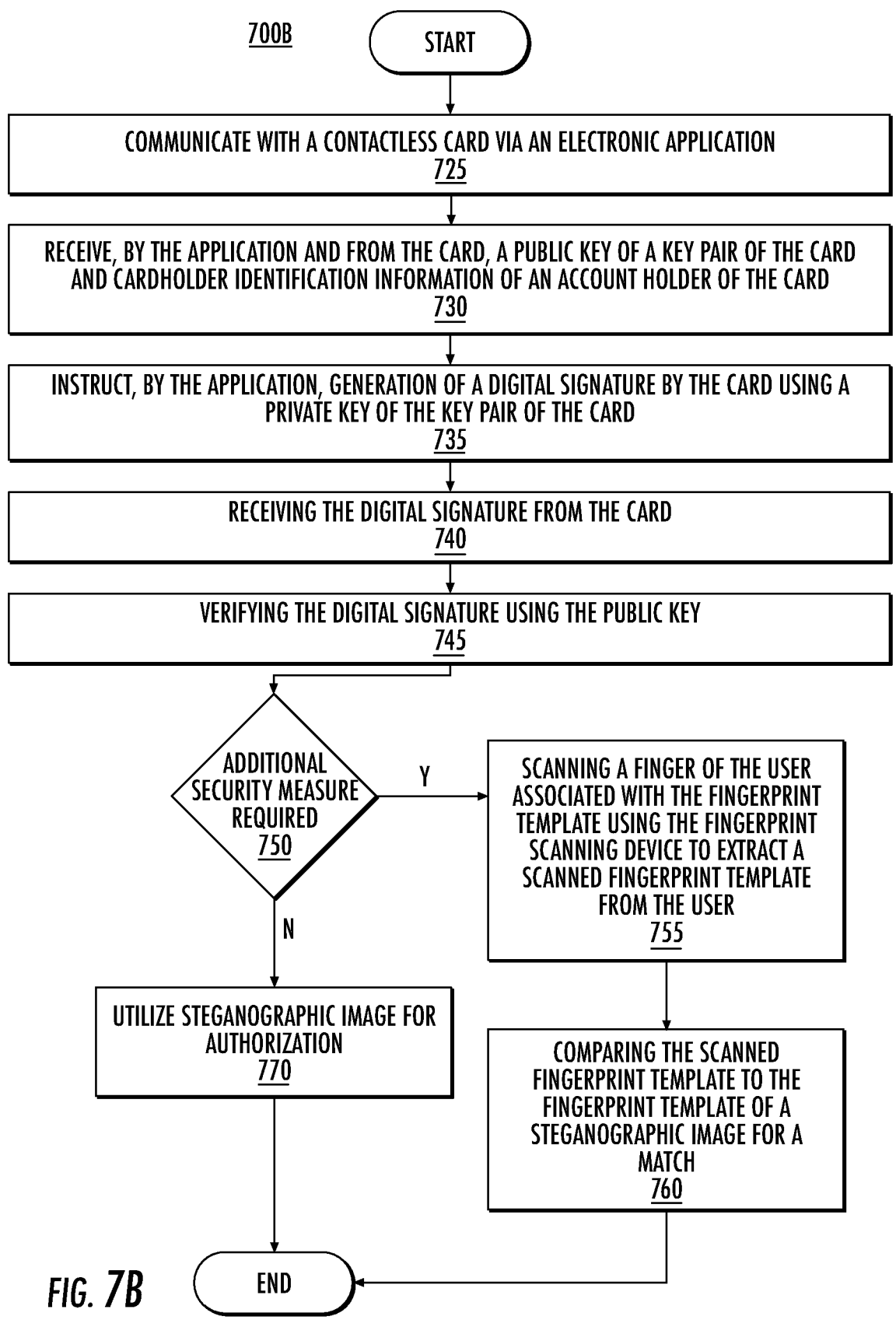
FIG. 7B illustrates an embodiment of a fourth logic flow.
Figure 7C:
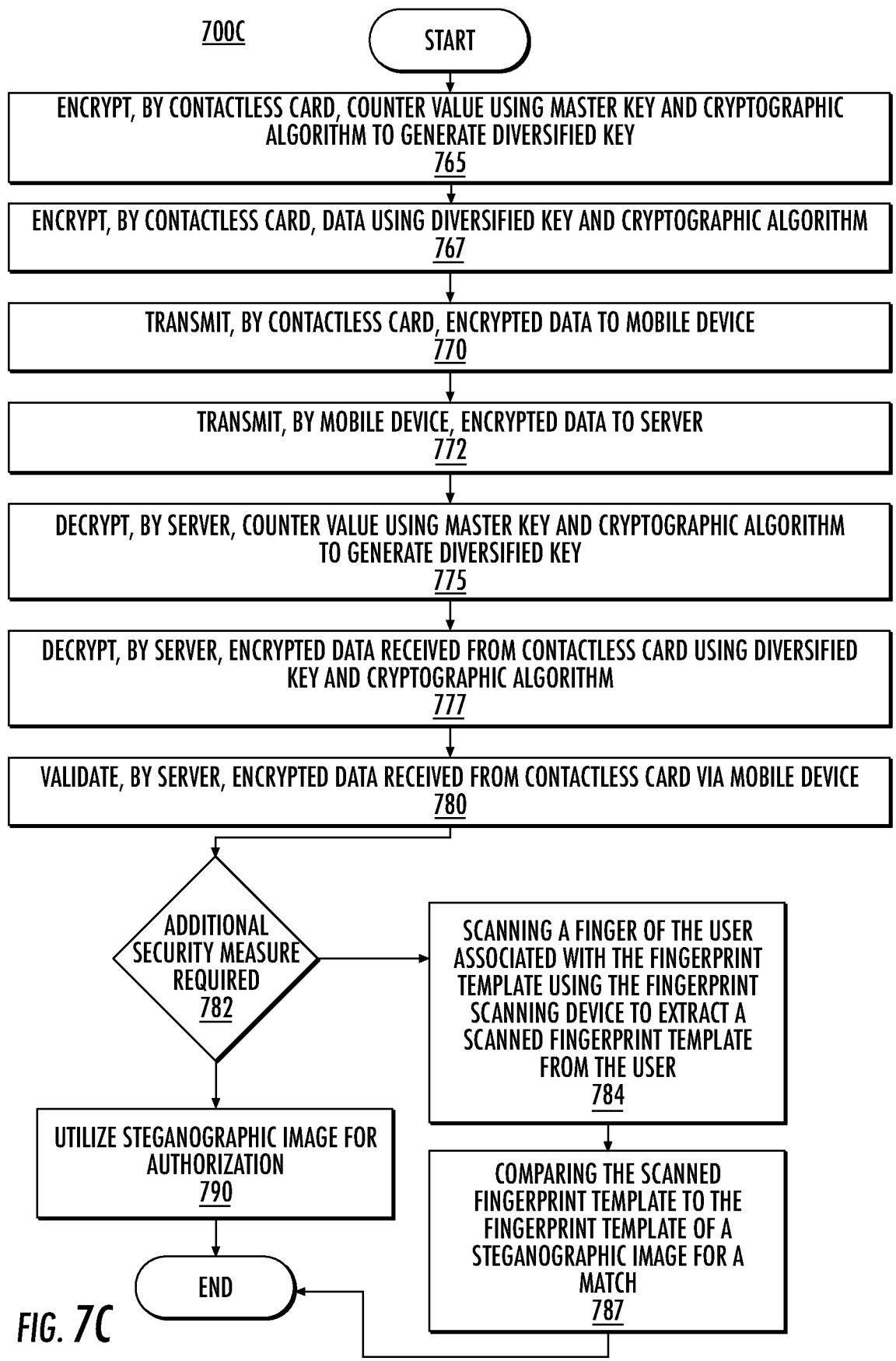
FIG. 7C illustrates an embodiment of a fourth logic flow

Whether or not access to various levels of information are granted as a result of a user credential comparison and/or whether or not the credential comparison servers as a precondition for completing the online and/or offline authentication, at block 710, at least one online and/or offline verification operation utilizing the contactless card 101 as discussed herein, including but not limited to at least one operation as discussed with respect to FIG. 7B and FIG. 7C, is performed to obtain access to a steganographic image 117b. For example, the authentication application 114 may commence the authentication protocol based on a first tap of the contactless card 101 on the mobile device and in order to access one or more features with respect to access application 116 and/or to complete a transaction in relation thereto. At block 715, responsive to a communication associated with the contactless card 101 and successful completion of the authentication protocol, the verification application can authorize the extraction (or use) of the steganographic image 117b from the memory of the contactless card 101 and/or the mobile device 110 for comparison to another generated fingerprint template of the user (e.g. as obtained using fingerprint scanner 138 and/or any other suitable fingerprint scanner, including one associated with a retail or service provider 148) in order to access one or more features of access application 116 and/or to complete a transaction relation thereto. In various embodiments, the subsequent fingerprint scan and fingerprint comparison takes place after a second tape of the contactless card 101 on the mobile device 110. In various embodiments, the successful completion of the authentication protocol grants a second-level access to information and/or features of access application 116, and a successful comparison of the steganographic image 117b results in access to a third-level of information or features, e.g. executing a payment transaction exceeding a certain monetary threshold.

FIG. 7B illustrates an embodiment of a logic flow 700B. The logic flow 700B may be representative of some or all of the operations executed by one or more embodiments described herein. For example, the logic flow 700B may include some or all of the operations to verify or authenticate a user utilizing an offline authentication technique and for utilizing a steganographically encoded image associated with a user after (or before) successfully completing the offline authentication technique. Embodiments are not limited in this context.

As shown, the logic flow 700B begins at block 725, where an application, e.g. authentication application 114 of mobile device 110, communicates with a contactless card 101. In various embodiments, the authentication application 114 receives, from a user, a first application user credential associated with a user profile. As mentioned above, a user may provide the first application user credentials after receiving a prompt from authentication application 114 and/or the user credentials may be provided after the user taps the contactless card 101 on the mobile device 110. In various embodiments, as stated above, the first application user credential may include biometrics data, an established gesture associated with user recognition, a username and password combination, and/or the like. In various embodiments, the processor 119 compares the first application user credential with a stored second application user credential. The stored second application user credential may be associated with a user identity. The user identity may include a personal identification number (PIN), a name of the user, an address, a date of birth, and/or the like. In various embodiments, after finding a first match, the authentication application 114 grants access to first-level user account options including a display of an account, a display of recent transactions, and/or the like. In various embodiments, the user credential comparison is skipped (not performed) entirely. At block 730, authentication application 114 receives a public key of a public/private key pair of the card from the contactless card 101.

At block 735, the authentication application 114 instructs the contactless card 101 to generate a digital signature by using a private key of the key pair of the card. The contactless card 101 generates the digital signature, and the authentication application 114 receives the digital signature from the contactless card 101 at block 740, and where at block 745 the mobile device may verify (by a processor 119 operation and/or utilizing an application, such as authentication application 114) the digital signature by using the public key of the key pair of the card.

Once the offline verification is completed with the verification of the digital signature, at block 745, a second-level of information or features can be granted with respect to access application 116. In various embodiments, the flow 700B can proceed directly to block 770, without performing the operation associated with block 755, and access to the first-level information or features and/or the second-level information and features is granted only when the steganographic image 117b is utilizes to perform an authentication in any fashion as disclosed herein. In various embodiments, the flow can skip block 755, and access to the first-level and/or second-level operations can be granted based on completion of the verification (or, with respect to the first-level access, upon a match of the credential comparison as discussed herein) without utilizing the steganographic image 117b.

In various embodiments, the steganographic image 117b can be used to authorize access to a third-level of information associated with access application 116 and/or to complete a transaction associated therewith. For example, as shown with respect to flow 700B, the authentication application 114 can determine if the feature to be accessed or transaction to be executed with respect to access application has a security concern, such as involving a payment transaction in excess of a certain threshold. If the authentication application 114 determines that the additional security measure is required, then the flow proceeds to block 755. Any suitable component associated with FIG. 1 and/or any other suitable components, such as a scanning device associated with a merchant, can scan a fingerprint of the user to obtain a fingerprint image of the user, and from the fingerprint image, a fingerprint template can be obtained. At block 760, any suitable component such as steganographic application 117a can compare the extracted fingerprint template to the fingerprint template part of steganographic image 117b for a match, and upon determining a successful match, access to the third-level information and/or completion of the transaction with a higher threshold of concern, e.g. a transaction exceeding a certain monetary threshold, can be completed or granted. In various embodiments, the comparison can be performed at the server 120, e.g. the fingerprint templates can be compared for a match by the management application 123, and upon confirming a match, the confirmation can be sent to authentication application 114 to authorize the relevant access to features associated with application 116 and/or completion of a transaction in relation thereto.

In various embodiments, the flow 700B can include a precondition for performing operations 725-745 in that the operations of 755 and 760 are performed first, where the fingerprint templates can be compared by any local suitable components, including but not limited to fingerprint scanner 138, steganographic application 117a, and/or a suitable third-party component (e.g. a scanner associated with a services or retail provider 148), and/or the fingerprint templates can be transmitted to server 120 and the management application compares them for a match. If a match is found, then the match is communicated to authentication application 114. In various embodiments, this confirmation can result in access to a second-level of information in relation to access application 116, and the offline protocol associated with 725-745 can be completed to access the third-level information and/or to complete a transaction with heightened security concerns.

FIG. 7C illustrates an embodiment of a logic flow 700C. The logic flow 700C may be representative of some or all of the operations executed by one or more embodiments described herein. For example, the logic flow 700C may include some or all of the operations to verify or authenticate a user utilizing an online authentication technique and a steganographically encoded image associated with a user. Embodiments are not limited in this context.

As shown, the logic flow 700C begins at block 765, where at least one of the authentication application 114, the OS 112, the management application 123, and/or any other suitable application may initiate a transaction to verify an identity of a user and utilize a steganographically encoded image 117b to access a feature associated with access application 116. In various embodiments, the verification may commence by tapping the contactless card 101 on the mobile device 110. In various embodiments, the access application 116 provides a prompt with a precondition for receiving the tap prompt or immediately after the tap takes place, but prior to any additional online verification operations, to enter user credentials for comparison for a first-level and/or second-level of information access in relation to access application 116, where the nature of the first-level features is described elsewhere herein. In various embodiments, the user credential is associated with a user profile and entered into an interface provided by the mobile device 110, where, as stated, the first application user credential may include biometrics data, an established gesture associated with user recognition, a username and password combination, and/or the like. The first application user credential may be transmitted by the authentication application 114 to the management application 123 of the server 120, where the first application user credential is compared to a stored second credential.

Pursuant to various embodiments, a communication between the mobile device 110 and the contactless card 101 is initiated, where the communication utilizes a card reader 118 and where the communication is based on an NFC protocol. In various embodiments, the communication is condition about the first-level comparison resulting in a match, and in various embodiments, instead of sending the first application credential for comparison at the server 120, the comparison is done between the mobile device 110 and the contactless card 101, where the stored second credential is stored in a memory 102 of the contactless card. In various embodiments, the comparison with respect to the user credential is omitted, and a tap of the contactless card 101 on the mobile device 110 initiates a prompt to select which application requires authentication, e.g. access application 116, and the NFC communication between the contactless card 101 and the mobile device 110 commences to initiate online verification or authentication of a user using a payment protocol consistent with an EMV standard, but for purposes that include a verification or authentication for purposes other than merely completing a sale or purchase. In various embodiments, as stated above a user taps the contactless card 101 to the mobile device 110 to cause the contactless card 101 to generate and transmit encrypted data (e.g., the encrypted customer ID 109). The contactless card 101 may increment the counter value 104 in the memory 102 responsive to receiving the indication to generate encrypted data.

In various embodiments, at block 767 the contactless card 101 generates a diversified key 106 using the counter value 104 and the master key 105 in the memory 102 and a cryptographic algorithm. The contactless card 101 can encrypt data (e.g., the customer identifier 107) using the diversified key 106 and the cryptographic algorithm, generating encrypted data (e.g., the encrypted customer ID 109).

At block 770, the contactless card 101 may transmit the encrypted data to the account application 113 of the mobile device 110, e.g., using NFC. In at least one embodiment, the contactless card 101 further includes an indication of the counter value 104 along with the encrypted data. At block 772, the account application 113 or the authentication application 114 of the mobile device 110 may transmit the data received from the contactless card 101 to the management application 123 of the server 120. At block 775, the management application 123 of the server 120 may generate a diversified key 106 using the master key 105 and the counter value 104 as input to a cryptographic algorithm. In one embodiment, the management application 123 uses the counter value 104 provided by the contactless card 101. In another embodiment, the management application 123 increments the counter value 104 in the memory 122 to synchronize the state of the counter value 104 in the memory 122 with the counter value 104 in the memory 102 of the contactless card 101.

At block 777, the management application 123 decrypts the encrypted data received from the contactless card 101 via the mobile device 110 using the diversified key 106 and a cryptographic algorithm. Doing so may yield at least the customer identifier 107. By yielding the customer identifier 107, the management application 123 may validate the data received from the contactless card 101 at block 780. For example, the management application 123 may compare the customer identifier 107 to a customer identifier for the associated account in the account data 124, and validate the data based on a match.

Once the online verification is completed a second-level of information or features can be granted with respect to access application 116. In various embodiments, the flow 700C can proceed directly to block 790, without performing the operation associated with block 782, and access to the first-level information or features and/or the second-level information and features is granted only when the steganographic image 117b is utilizes to perform an authentication in any fashion as disclosed herein. In various embodiments, the flow can skip block 790, and access to the first-level and/or second-level operations can be granted based on completion of the verification (or, with respect to the first-level access, upon a match of the credential comparison as discussed herein) without utilizing the steganographic image 117b.

In various embodiments, the steganographic image 117b can be used to authorize access to a third-level of information associated with access application 116 and/or to complete a transaction associated therewith. For example, as shown with respect to flow 700C, the authentication application 114 or the management application 123 can determine if the feature to be accessed or transaction to be executed with respect to access application has a security concern, such as involving a payment transaction in excess of a certain threshold. If the authentication application 114 or the management application 123 determines that the additional security measure is required, then the flow proceeds to block 782. Any suitable component associated with FIG. 1 and/or any other suitable components, such as a scanning device associated with a merchant, can scan a fingerprint of the user to obtain a fingerprint image of the user, and from the fingerprint image, a fingerprint template can be obtained. At block 787, any suitable component such as steganographic application 117a can compare the extracted fingerprint template to the fingerprint template part of steganographic image 117b for a match, and upon determining a successful match, authorize access to the third-level information and/or completion of the transaction with a higher threshold of concern, e.g. a transaction exceeding a certain monetary threshold, can be completed or granted. In various embodiments, the comparison can be performed at the server 120, e.g. the fingerprint templates can be compared for a match by the management application 123, and upon confirming a match, the confirmation can be sent to authentication application 114 to authorize the relevant access to features associated with application 116 and/or completion of a transaction in relation thereto. In various embodiments the steganographic image 117b can be contained in the memory of server 120 based on a previous transmission operation, e.g. the steganographic encoding was performed at the server and/or once the steganographic encoding with respect to image 117b is performed locally by a local application, e.g. steganographic application 117a associated with mobile device 110, the image 117b can be transmitted to the server 120 by any suitable component or application of the local device, e.g. authentication application 114.

In various embodiments, the flow 700C can include a precondition for performing operations 765-780 in that the operations of 784 and 787 are performed first, where the fingerprint templates can be compared by any local suitable components, including but not limited to fingerprint scanner 138, steganographic application 117a, and/or a suitable third-party component (e.g. a scanner associated with a services or retail provider 148), and/or the fingerprint templates can be transmitted to server 120 and the management application compares them for a match. If a match is found, then the match is communicated to management application 123. In various embodiments, this confirmation can result in access to a second-level of information in relation to access application 116, and the online protocol associated with 765-780 can be completed to access the third-level information and/or to complete a transaction with heightened security concerns.

In various embodiments, the contactless card 101 may be tapped to a device, such as one or more computer kiosks or terminals, to verify identity so as to receive a transactional item responsive to a purchase, such as a coffee. By using the contactless card 101, a secure method of proving identity in a loyalty program may be established. Securely proving the identity, for example, to obtain a reward, coupon, offer, or the like or receipt of a benefit is established in a manner that is different than merely scanning a bar card. For example, an encrypted transaction may occur between the contactless card 101 and the device, which may be configured to process one or more tap gestures. As explained above, the one or more applications may be configured to validate identity of the user and then cause the user to act or respond to it, for example, via one or more tap gestures. In various embodiments, data for example, bonus points, loyalty points, reward points, healthcare information, etc., may be written back to the contactless card.

In various embodiments, the contactless card 101 may be tapped to a device, such as the mobile device 110. As explained above, identity of the user may be verified by the one or more applications which can then grant the user a desired benefit based on verification of the identity.

In various embodiments, an example authentication communication protocol may mimic an offline dynamic data authentication protocol of the EMV standard that is commonly performed between a transaction card and a point-of-sale device, with some modifications. For example, because the example authentication protocol is not used to complete a payment transaction with a card issuer/payment processor per se, some data values are not needed, and authentication may be performed without involving real-time online connectivity to the card issuer/payment processor. As is known in the art, point of sale (POS) systems submit transactions including a transaction value to a card issuer. Whether the issuer approves or denies the transaction may be based on if the card issuer recognizes the transaction value. Meanwhile, in certain embodiments of the present disclosure, transactions originating from a mobile device lack the transaction value associated with the POS systems. Therefore, in various embodiments, a dummy transaction value (i.e., a value recognizable to the card issuer and sufficient to allow activation to occur) may be passed as part of the example authentication communication protocol. POS based transactions may also decline transactions based on the number of transaction attempts (e.g., transaction counter). A number of attempts beyond a buffer value may result in a soft decline; the soft decline requiring further verification before accepting the transaction. In some implementations, a buffer value for the transaction counter may be modified to avoid declining legitimate transactions.

In various embodiments, the contactless card 101 can selectively communicate information depending upon the recipient device. Once tapped, the contactless card 101 can recognize the device to which the tap is directed and based on this recognition the contactless card can provide appropriate data for that device. This advantageously allows the contactless card to transmit only the information required to complete the instant action or transaction, such as a payment or card authentication. By limiting the transmission of data and avoiding the transmission of unnecessary data, both efficiency and data security can be improved. The recognition and selective communication of information can be applied to a various scenarios, including card activation, balance transfers, account access attempts, commercial transactions, and step-up fraud reduction.

If the tap of the contactless card 101 is directed to a device running Apple's iOS® operating system, e.g., an iPhone, iPod, or iPad, the contactless card can recognize the iOS® operating system and transmit data appropriate data to communicate with this device. For example, the contactless card 101 can provide the encrypted identity information necessary to authenticate the card using NDEF tags via, e.g., NFC. Similarly, if the contactless card tap is directed to a device running the Android® operating system, e.g., an Android® smartphone or tablet, the contactless card can recognize the Android® operating system and transmit appropriate and data to communicate with this device (such as the encrypted identity information necessary for authentication by the methods described herein).

As another example, the contactless card tap can be directed to a POS device, including without limitation a kiosk, a checkout register, a payment station, or other terminal. Upon performance of the tap, the contactless card 101 can recognize the POS device and transmit only the information necessary for the action or transaction. For example, upon recognition of a POS device used to complete a commercial transaction, the contactless card 101 can communicate payment information necessary to complete the transaction under the EMV standard.

In various embodiments, the POS devices participating in the transaction can require or specify additional information, e.g., device-specific information, location-specific information, and transaction-specific information, that is to be provided by the contactless card. For example, once the POS device receives a data communication from the contactless card, the POS device can recognize the contactless card and request the additional information necessary to complete an action or transaction.

In various embodiments the POS device can be affiliated with an authorized merchant or other entity familiar with certain contactless cards or accustomed to performing certain contactless card transactions. However, it is understood such an affiliation is not required for the performance of the described methods.

In various embodiments, such as a shopping store, grocery store, convenience store, or the like, the contactless card 101 may be tapped to a mobile device without having to open an application, to indicate a desire or intent to utilize one or more of reward points, loyalty points, coupons, offers, or the like to cover one or more purchases. Thus, an intention behind the purchase is provided.

In various embodiments, the one or more applications may be configured to determine that it was launched via one or more tap gestures of the contactless card 101, such that a launch occurred at 3:51 pm, that a transaction was processed or took place at 3:56 pm, in order to verify identity of the user.

In various embodiments, the one or more applications may be configured to control one or more actions responsive to the one or more tap gestures. For example, the one or more actions may comprise collecting rewards, collecting points, determine the most important purchase, determine the least costly purchase, and/or reconfigure, in real-time, to another action.

In various embodiments, data may be collected on tap behaviors as biometric/gestural authentication. For example, a unique identifier that is cryptographically secure and not susceptible to interception may be transmitted to one or more backend services. The unique identifier may be configured to look up secondary information about individual. The secondary information may comprise personally identifiable information about the user. In various embodiments, the secondary information may be stored within the contactless card.

In various embodiments, the device may comprise an application that splits bills or check for payment amongst a plurality of individuals. For example, each individual may possess a contactless card, and may be customers of the same issuing financial institution, but it is not necessary. Each of these individuals may receive a push notification on their device, via the application, to split the purchase. Rather than accepting only one card tap to indicate payment, other contactless cards may be used. In various embodiments, individuals who have different financial institutions may possess contactless cards 101 to provide information to initiate one or more payment requests from the card-tapping individual.

In various embodiments, the present disclosure refers to a tap of the contactless card. However, it is understood that the present disclosure is not limited to a tap, and that the present disclosure includes other gestures (e.g., a wave or other movement of the card).

Figure 8:
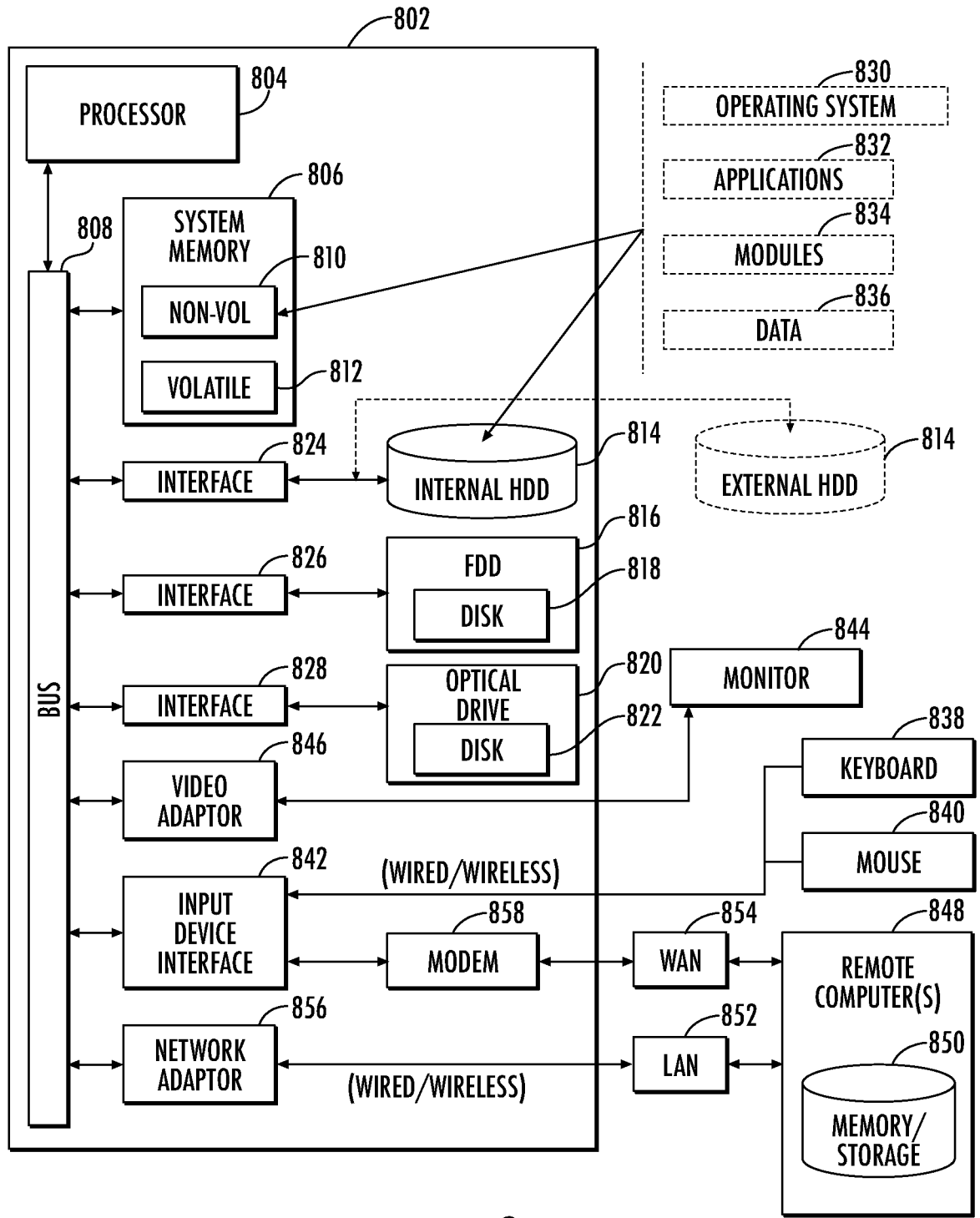
FIG. 8 illustrates an embodiment of a computing architecture.

FIG. 8 illustrates an embodiment of an exemplary computing architecture 800 comprising a computing system 802 that may be suitable for implementing various embodiments as previously described. In various embodiments, the computing architecture 800 may comprise or be implemented as part of an electronic device. In various embodiments, the computing architecture 800 may be representative, for example, of a system that implements one or more components of the system 100. In various embodiments, computing system 802 may be representative, for example, of the mobile devices 110 and server 120 of the system 100. The embodiments are not limited in this context. More generally, the computing architecture 800 is configured to implement all logic, applications, systems, methods, apparatuses, and functionality described herein with reference to FIGS. 1-7C.

As used in this application, the terms "system" and "component" and "module" are intended to refer to a computer-related entity, either hardware, a combination of hardware and software, software, or software in execution, examples of which are provided by the exemplary computing architecture 800. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 802 includes various common computing elements, such as one or more processors, multi-core processors, co-processors, processing circuitry memory units, chipsets, controllers, peripherals, interfaces, oscillators, timing devices, video cards, audio cards, multimedia input/output (I/O) components, power supplies, and so forth. The embodiments, however, are not limited to implementation by the computing system 802.

As shown in FIG. 8, the computing system 802 comprises a processor 804, a system memory 806 and a system bus 808. The processor 804 can be any of various commercially available computer processors or computer process circuitry, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi-processor architectures may also be employed as the processor 804. The processor 804 may be configured by associated memory instructions contained in the system memory 806, such that when the instructions re executed on the processor (e.g. processor circuitry) 804, the processor may carry out one or more operations associated with any one of FIG. 5-FIG. 7B and/or any other operation or technique as disclosed herein.

The system bus 808 provides an interface for system components including, but not limited to, the system memory 806 to the processor 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computing system 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies. The computing system 802 is generally is configured to implement all logic, systems, methods, apparatuses, and functionality described herein with reference to FIGS. 1-7.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In various embodiments, the one or more application programs 832, other program modules 834, and program data 836 can include, for example, the various applications and/or components of the system 100, e.g., the operating system 112, account application 113, authentication application 114, other applications 115, access application 116, and the management application 123.

A user can enter commands and information into the computing system 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computing system 802. In addition to the monitor 844, a computer typically includes other peripheral output devices, such as speakers, printers, and so forth.

The computing system 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computing system 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet. In embodiments, the network 130 of FIG. 1 is one or more of the LAN 852 and the WAN 854.

When used in a LAN networking environment, the computing system 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computing system 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computing system 802, or portions thereof, can be stored in the remote memory/storage device 850. It will be appreciated that the network connections shown are exemplary and other means of establishing a communications link between the computers can be used.

The computing system 802 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least various embodiments may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Various embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure.

It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

What is claimed is:

1. A method, comprising:
    performing at least one verification operation by an application executing on a processor of a client device in communication with a contactless card using near field communication (NFC);
    responsive to performing the at least one verification operation, receiving, by the client device from the contactless card, a steganographic image, wherein the steganographic image includes an image of a government issued identification steganographically encoded with a fingerprint template; and
    authenticating a user associated with the client device based on the steganographic image.

2. The method of claim 1, further comprising:
    creating the steganographic image based on a certification of the image of the government issued identification, wherein the certification certifies the image of the government issued identification as authentic.

3. The method of claim 1, wherein the authenticating comprises:
    receiving, from a scanning device, a fingerprint scan of a finger of the user;
    extracting a scanned fingerprint template from the fingerprint scan; and
    comparing the scanned fingerprint template to the received fingerprint template for a match.

4. The method of claim 1, wherein performing the at least one verification operation comprises:
    receiving, by the application from the contactless card, a public key of a key pair of the contactless card and a user identification, the user identification including the steganographic image;
    instructing, by the application, generation of a digital signature by the card using a private key of the key pair of the card;
    receiving the digital signature from the card; and
    verifying the digital signature using the public key.

5. The method of claim 4, further comprising:
    comparing a first application user credential with a stored second application user credential, the stored second application user credential being associated with a user identity, wherein the performing of the at least one verification operation is responsive finding a match between the first application user credential and the stored second application user credential.

6. The method of claim 4, wherein performing the at least one verification operation further comprises:
    determining if a transaction associated with NFC communication with a transaction device exceeds a monetary threshold amount; and
    if the transaction exceeds the monetary threshold amount, perform an additional security confirmation measure, and
    if the transaction does not exceed the monetary threshold amount, receive a message that the user has been authenticated at the transaction device.

7. The method of claim 6, wherein performing the additional security confirmation measure comprises:
    scanning a finger of the user associated with the fingerprint template using a scanning device to extract a scanned fingerprint template from the user;
    transmitting the scanned fingerprint template and the received fingerprint template to a server;
    comparing, at the server, the scanned fingerprint template to the received fingerprint template for a match; and
    receiving, at the transaction device and from the server, an indication confirming the match.

8. The method of claim 1, wherein performing the at least one verification operation comprises:
    determining, by the application, that the user has initiated a transaction with a transaction device to identify the user;
    receiving, by the application, encrypted data from the contactless card, the encrypted data generated based a cryptographic algorithm and a diversified key, the diversified key stored in a memory of the contactless card and generated based on a master key and a counter value stored in the memory of the contactless card;
    transmitting, by the application, the encrypted data to a server;
    receiving, by the application from the server, verification of the encrypted data, the server to decrypt the encrypted data based on the cryptographic algorithm and the diversified key stored in a memory of the server to verify the encrypted data, the diversified key stored in the memory of the server generated based on a master key and a counter value stored in the memory of the server; and
    receiving, by the application from the server, the steganographic image from the server.

9. An apparatus, comprising:
    a processor circuit; and
    a memory storing instructions which when executed by the processor circuit, cause the processor circuit to:
        perform at least one verification operation by an application executing on the processor circuit in communication with a contactless card using near field communication (NFC); and
        responsive to performing the at least one verification operation, receive, by the application from the contactless card, a steganographic image to authenticate a user, wherein the steganographic image includes an image of a government issued identification steganographically encoded with a fingerprint template.

10. The apparatus of claim 9, wherein the steganographic image is based on a certification of the image of the government issued identification, the memory storing instructions which when executed by the processor circuit, cause the processor circuit to:
    receive, from a scanning device, a fingerprint scan of a finger of the user;
    extract a scanned fingerprint template from the fingerprint scan; and
    determine, based on a comparison, that the scanned fingerprint template and the received fingerprint template match to authenticate the user.

11. The apparatus of claim 10, wherein the instructions to perform the at least one verification operation comprise instructions to:
    receive, by the application from the contactless card, a public key of a key pair of the contactless card and a user identification, the user identification including the steganographic image;

receive, by the application, a digital signature generated by the card using a private key of the key pair of the card; and verify the digital signature using the public key.

12. The apparatus of claim 11, the memory storing instructions which when executed by the processor circuit, cause the processor circuit to:

compare a first application user credential with a stored second application user credential, the stored second application user credential being associated with a user identity, wherein the performing of the at least one verification operation is responsive finding a match between the first application user credential and the stored second application user credential.

13. The apparatus of claim 9, the memory storing instructions which when executed by the processor circuit, cause the processor circuit to:

receive, by the application and from the contactless card, a public key of a key pair of the contactless card and a user identification, the user identification including the steganographic image;

receive, by the application, a digital signature generated by the card using a private key of the key pair of the card;

verify the digital signature using the public key;

determining if a transaction associated with NFC communication with a transaction device exceeds a monetary threshold amount; and if the transaction exceeds the monetary threshold amount, perform an additional security confirmation measure, and if the transaction does not exceed the monetary threshold amount, receive a message that the user has been authenticated at the transaction device.

14. The apparatus of claim 9, wherein the instructions to perform the at least one verification operation comprise instructions to:

determine, by the application, that the user has initiated a transaction with a transaction device to identify the user;

receive, by the application, encrypted data from the contactless card, the encrypted data based on a cryptographic algorithm and a diversified key, the diversified key based on a master key and a counter value;

transmit, by the application, the encrypted data to a server;

receive, by the application from the server, verification of the encrypted data, the server to decrypt the encrypted data based on an instance of the diversified key to verify the encrypted data; and receive, by the application from the server, the steganographic image from the server.

15. A non-transitory computer-readable storage medium comprising computer-readable instructions executable by a processor circuit to cause the processor circuit to:

perform at least one verification operation by an application executing on the processor circuit in communication with a contactless card using near field communication (NFC); and responsive to performing the at least one verification operation, receive, by application from the contactless card, a steganographic image to authenticate a user, wherein the steganographic image includes an image of a government issued identification steganographically encoded with a fingerprint template.

16. The computer-readable storage medium of claim 15, wherein the steganographic image is based on a certification of the image of the government issued identification, the medium comprising instructions executable by the processor circuit to cause the processor circuit to:

receive, from a scanning device, a fingerprint scan of a finger of the user;

extract a scanned fingerprint template from the fingerprint scan; and determine, based on a comparison, that the scanned fingerprint template and the received fingerprint template match to authenticate the user.

17. The computer-readable storage medium of claim 16, the instructions to perform the at least one verification comprising instructions to:

receive, by the application from the contactless card, a public key of a key pair of the contactless card and a user identification, the user identification including the steganographic image;

receive, by the application, a digital signature generated by the card using a private key of the key pair of the card; and verify the digital signature using the public key.

18. The computer-readable storage medium of claim 17, comprising instructions executable by the processor circuit to cause the processor circuit to:

compare a first application user credential with a stored second application user credential, the stored second application user credential being associated with a user identity, wherein the performing of the at least one verification operation is responsive finding a match between the first application user credential and the stored second application user credential.

19. The computer-readable storage medium of claim 15, the instructions to perform the at least one verification comprising instructions to:

receive, by the application and from the contactless card, a public key of a key pair of the contactless card and a user identification, the user identification including the steganographic image;

instruct, by the application, generation of a digital signature by the card using a private key of the key pair of the card;

receive the digital signature from the card;

verify the digital signature using the public key;

determine if a transaction associated with NFC communication with a transaction device exceeds a monetary threshold amount; and if the transaction exceeds the monetary threshold amount, perform an additional security confirmation measure, and if the transaction does not exceed the monetary threshold amount, receive a message that the user has been authenticated at the transaction device.

20. The computer-readable storage medium of claim 15, the instructions to perform the at least one verification comprising instructions to:

determine, by the application, that the user has initiated a transaction with a transaction device to identify the user;

receive, by the application, encrypted data from the contactless card, the encrypted data based on a cryptographic algorithm and a diversified key, the diversified key based on a master key and a counter value;

transmit, by the application, the encrypted data to a server;

receive, by the application from the server, verification of the encrypted data, the server to decrypt the encrypted data based on an instance of the diversified key to verify the encrypted data; and receive, by the application from the server, the steganographic image from the server.

* * * * *